United States Patent
Yamanaka et al.

(10) Patent No.: US 10,665,876 B2
(45) Date of Patent: May 26, 2020

(54) FUEL CELL SYSTEM

(71) Applicant: TOYOTA JIDOSHA KABUSHIKI KAISHA, Toyota-shi, Aichi-ken (JP)

(72) Inventors: Tomio Yamanaka, Nagoya (JP); Masashi Toida, Nagoya (JP); Hiroyuki Imanishi, Toyota (JP); Seiichi Tanaka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 173 days.

(21) Appl. No.: 15/831,766

(22) Filed: Dec. 5, 2017

(65) Prior Publication Data

US 2019/0173111 A1  Jun. 6, 2019

(51) Int. Cl.
| | |
|---|---|
| *H01M 8/04089* | (2016.01) |
| *H01M 8/0438* | (2016.01) |
| *G05D 7/06* | (2006.01) |
| *H01M 8/04223* | (2016.01) |
| *H01M 16/00* | (2006.01) |
| *H01M 8/04746* | (2016.01) |
| *H01M 8/04302* | (2016.01) |

(52) U.S. Cl.
CPC ...... *H01M 8/04097* (2013.01); *G05D 7/0682* (2013.01); *H01M 8/0441* (2013.01); *H01M 8/04089* (2013.01); *H01M 8/04253* (2013.01); *H01M 8/04268* (2013.01); *H01M 8/04302* (2016.02); *H01M 8/04402* (2013.01); *H01M 8/04753* (2013.01); *H01M 8/04761* (2013.01); *H01M 16/006* (2013.01)

(58) Field of Classification Search
CPC ......... H01M 8/04097; H01M 8/04268; H01M 8/04402; H01M 8/0441; H01M 8/4302; H01M 8/04089; H01M 8/04253; H01M 8/04254; H01M 8/04753; H01M 8/04761; H01M 16/00
See application file for complete search history.

(56) References Cited

U.S. PATENT DOCUMENTS

| | | | | |
|---|---|---|---|---|
| 2002/0146602 A1* | 10/2002 | Abe | .......... | H01M 8/04014 429/429 |
| 2010/0266920 A1* | 10/2010 | Kanie | .......... | H01M 8/04089 429/431 |
| 2014/0205926 A1* | 7/2014 | Yamanaka | ........ | H01M 8/04223 429/446 |

FOREIGN PATENT DOCUMENTS

| | | |
|---|---|---|
| JP | 2004-172027 | 6/2004 |
| JP | 2012-99220 | 5/2012 |
| JP | 2014-143106 | 8/2014 |

* cited by examiner

*Primary Examiner* — Gregg Cantelmo
(74) *Attorney, Agent, or Firm* — Finnegan, Henderson, Farabow, Garrett & Dunner, LLP

(57) ABSTRACT

A control unit of a fuel cell system includes a valve control unit configured such that, when it is determined that an exhaust valve is stuck open in a quick warming-up operation, the valve control unit sets at least one of an operable opening area which is an opening area capable of being changed by control and a rate of opening change which is an opening changeable frequency at which an opening is changeable per unit time, for at least one of a pressure adjusting valve and a flow division valve, such that a flow rate of a cathode gas supplied to a fuel cell is in an allowable range of a requested supply flow rate required for the quick warming-up operation.

9 Claims, 12 Drawing Sheets

FUEL CELL SYSTEM

INCORPORATION BY REFERENCE

The disclosure of Japanese Patent Application No. 2016-239142 filed on Dec. 9, 2016 including the specification, drawings and abstract is incorporated herein by reference in its entirety.

BACKGROUND

1. Technical Field

The disclosure relates to a fuel cell system.

2. Description of Related Art

A technique of providing a bypass passage which is connected to a cathode gas supply passage and bypasses a fuel cell to prevent high-concentration hydrogen from being discharged to the atmospheric air (the outside) in a fuel cell system is known (for example, see Japanese Unexamined Patent Application Publication No. 2004-172027 (JP 2004-172027 A)). In the related art, hydrogen to be discharged is diluted using a cathode gas flowing in the bypass passage. In the related art, supply of a cathode gas to the bypass passage and supply of a cathode gas from the cathode gas supply passage to a fuel cell are adjusted by a valve. In the related art, an anode gas discharge passage that is used to discharge an anode gas supplied to the fuel cell and an exhaust valve disposed in the anode gas discharge passage are provided. The anode gas discharged from the fuel cell circulates in the anode gas supply passage and is supplied to the fuel cell by setting the exhaust valve to a closed state, and is discharged to the atmospheric air via the anode gas discharge passage by setting the exhaust valve to an open state if necessary.

SUMMARY

In a fuel cell system, a quick warming-up operation for quickly increasing the temperature of a fuel cell may be performed. In the quick warming-up operation, a cathode gas flow rate which is almost the same as the cathode gas flow rate required for the quick warming-up operation is supplied to the fuel cell. In the quick warming-up operation, an anode gas is supplied to the fuel cell.

Due to freezing or malfunction of an exhaust valve, or the like, the exhaust valve may be maintained in an open state (a stuck-open state) even when a command for closing the exhaust valve is transmitted from a control unit. In the stuck-open state, the anode gas discharged from the fuel cell is discharged to the atmospheric air via the anode gas discharge passage. Accordingly, it is necessary to dilute the anode gas to be discharged to the atmospheric air by increasing a flow rate of the cathode gas flowing in the bypass passage (a bypass flow rate). In the quick warming-up operation, a cathode gas flow rate supplied to the fuel cell (a fuel-cell-side cathode gas flow rate) is a flow rate which is determined by a request for the quick warming-up operation (a requested supply flow rate). Accordingly, in order to increase the flow rate of the cathode gas flowing in the bypass passage, it is necessary to increase a flow rate of the cathode gas before branching to the bypass passage (a total cathode gas flow rate) using a compressor. In this case, the total cathode gas flow rate increases, but since flow rate of the cathode gas supplied to the fuel cell (the fuel-cell-side cathode gas flow rate) is the requested supply flow rate, it is necessary to accurately control a ratio (a flow division ratio) of the fuel-cell-side cathode gas flow rate to the total cathode gas flow rate.

When the fuel-cell-side cathode gas flow rate changes with respect to the requested supply flow rate in the quick warming-up operation, an amount of power generated by the fuel cell may be changed and performance of the fuel cell system may deteriorate. For example, in a vehicle in which the fuel cell system is mounted, there is a likelihood that an occupant will feel discomfort when boarding the vehicle. Accordingly, there is demand for a technique by which an amount of power generated by a fuel cell can be prevented from changing greatly when a fuel cell performs a quick warming-up operation and an exhaust valve is stuck open.

The disclosure can be embodied in the following aspects.

(1) According to an aspect of the disclosure, there is provided a fuel cell system. The fuel cell system includes: a fuel cell; a cathode gas supply passage that supplies a cathode gas to the fuel cell; a cathode gas discharge passage that discharges the cathode gas from the fuel cell; a pressure adjusting valve that is disposed in the cathode gas discharge passage and adjusts a backpressure on a cathode side of the fuel cell; a compressor that is disposed in the cathode gas supply passage; a bypass passage that discharges a part of the cathode gas ejected from the compressor to the cathode gas discharge passage such that the part of the cathode gas bypasses the fuel cell; a flow division valve that is disposed in a connecting portion of the bypass passage and the cathode gas supply passage and adjusts a flow rate ratio of the cathode gas supplied to the fuel cell and the cathode gas supplied to the bypass passage; an anode gas supply passage that supplies an anode gas to the fuel cell; an anode gas discharge passage that discharges the anode gas from the fuel cell; an exhaust valve that is disposed in the anode gas discharge passage and exhausts the anode gas; a merging discharge passage that discharges the anode gas discharged from the anode gas discharge passage and the cathode gas discharged from the cathode gas discharge passage; and a control unit configured to control an operation of the fuel cell system. The control unit includes a power generation control unit configured to control an amount of power generated by the fuel cell in a quick warming-up operation of increasing a temperature of the fuel cell using heat emitted from the fuel cell, a determination unit configured to determine whether the exhaust valve is stuck open, and a valve control unit configured such that, when it is determined that the exhaust valve is stuck open in the quick warming-up operation, the valve control unit sets at least one of an operable opening area which is an opening area capable of being changed by control and a rate of opening change which is an opening changeable frequency at which the opening is changeable per unit time, for at least one of the pressure adjusting valve and the flow division valve, such that a flow rate of the cathode gas supplied to the fuel cell is in an allowable range of a requested supply flow rate required for the quick warming-up operation. According to this aspect, when the fuel cell performs a quick warming-up operation and the exhaust valve is stuck open, the valve control unit sets at least one of the operable opening area and the rate of opening change such that the flow rate of the cathode gas is in the allowable range of the requested supply flow rate. Accordingly, since a flow division ratio can be accurately controlled, it is possible to prevent an amount of power generated by the fuel cell from changing significantly.

(2) In the aspect, the valve control unit may be configured to change the operable opening area of the pressure adjusting valve to an area in the allowable range when an opening of the pressure adjusting valve is changed in a minimum unit and the flow rate of the cathode gas supplied to the fuel cell gets out of the allowable range, and may be configured to set an opening of the flow division valve such that the flow rate of the cathode gas supplied to the fuel cell does not change at an opening of the pressure adjusting valve before the operable opening area changes and at an opening of the pressure adjusting valve after the operable opening area changes. According to this aspect, it is possible to accurately control a flow division ratio by changing the operable opening area of the pressure adjusting valve to an area in the allowable range. Accordingly, it is possible to prevent an amount of power generated by the fuel cell from changing significantly.

(3) In the aspect, the valve control unit may be configured to change the operable opening area of the flow division valve to an area in the allowable range when an opening of the flow division valve is changed in a minimum unit and the flow rate of the cathode gas supplied to the fuel cell gets out of the allowable range of the requested supply flow rate, and may be configured to set an opening of the pressure adjusting valve such that the flow rate of the cathode gas supplied to the fuel cell does not change at an opening of the flow division valve before the operable opening area changes and at an opening of the flow division valve after the operable opening area changes. According to this aspect, it is possible to accurately control a flow division ratio by changing the operable opening area of the flow division valve to an area in the allowable range. Accordingly, it is possible to prevent an amount of power generated by the fuel cell from changing significantly.

(4) The fuel cell system according to the aspect may further include a secondary battery that performs supply of power to the fuel cell and charging with power generated by the fuel cell, and the allowable range may be set based on a requested amount of power generated by the fuel cell which is required for the quick warming-up operation and an allowable charging/discharging power of the secondary battery. According to this aspect, it is possible to set the allowable range in consideration of the allowable charging/discharging power of the secondary battery. Accordingly, even when the amount of generated power gets out of the requested amount of generated power, it is possible to adjust the over-power using the secondary battery.

(5) In the aspect, the valve control unit may be configured to compare a first change which is a change of the flow rate of the cathode gas supplied to the fuel cell when the opening of the pressure adjusting valve changes in a minimum unit with a second change which is a change of the flow rate of the cathode gas supplied to the fuel cell when the opening of the flow division valve changes in a minimum unit, may be configured to set the opening of the pressure adjusting valve to be constant when the first change is greater than the second change, may be configured to set the opening of the flow division valve to be constant when the second change is greater than the first change, and may be configured to control the opening of the valve having the smaller change of flow rate of the pressure adjusting valve and the flow division valve such that the flow rate of the cathode gas is in an allowable range of the requested supply flow rate. According to this aspect, it is possible to accurately control a flow division ratio by setting the opening of one valve having a larger flow rate change of the pressure adjusting valve and the flow division valve to be constant and controlling the opening of the other valve. Accordingly, it is possible to prevent an amount of power generated by the fuel cell from changing significantly.

(6) In the aspect, valve control unit may be configured to set the openings of the pressure adjusting valve and the flow division valve to be constant in a case in which the flow rate of the cathode gas supplied to the fuel cell gets out of the allowable range when the opening of the pressure adjusting valve changes in a minimum unit and in a case in which the flow rate of the cathode gas supplied to the fuel cell gets out of the allowable range when the opening of the flow division valve changes in a minimum unit, and the power generation control unit may be configured to control the flow rate of the cathode gas ejected from the compressor such that the flow rate of the cathode gas is in the allowable range of the requested supply flow rate. According to this aspect, it is possible to accurately control a flaw division ratio by setting the openings of the pressure adjusting valve and the flow division valve to be constant and controlling a flow rate ejected from the compressor. Accordingly, it is possible to prevent an amount of power generated by the fuel cell from changing significantly.

(7) In the aspect, the valve control unit may be configured to compare a first change which is a change of the flow rate of the cathode gas supplied to the fuel cell when the opening of the pressure adjusting valve changes in a minimum unit with a second change which is a change of the flow rate of the cathode gas supplied to the fuel cell when the opening of the flow division valve changes in a minimum unit, may be configured to set a rate of opening change of the pressure adjusting valve to be higher than at normal times when the first change is greater than the second change, and may be configured to set a rate of opening change of the flow division valve to be higher than at normal times when the second change is greater than the first change. According to this aspect, it is possible to accurately control a flow division ratio by setting the rate of opening change of one valve having a larger flow rate change of the pressure adjusting valve and the flow division valve to be higher than at normal times and controlling the opening of the other valve. Accordingly, it is possible to prevent an amount of power generated by the fuel cell from changing significantly.

(8) According to another aspect of the disclosure, there is provided a fuel cell system. The fuel cell system includes: a fuel cell; a cathode gas supply passage that supplies a cathode gas to the fuel cell; a cathode gas discharge passage that discharges the cathode gas from the fuel cell; a pressure adjusting valve that is disposed in the cathode gas discharge passage and adjusts a backpressure on a cathode side of the fuel cell; a compressor that is disposed in the cathode gas supply passage; a bypass passage that discharges a part of the cathode gas ejected from the compressor to the cathode gas discharge passage such that the part of the cathode gas bypasses the fuel cell; a flow division valve that is disposed in a connecting portion of the bypass passage and the cathode gas supply passage and adjusts a flow rate ratio of the cathode gas supplied to the fuel cell and the cathode gas supplied to the bypass passage; an anode gas supply passage that supplies an anode gas to the fuel cell; an anode gas discharge passage that discharges the anode gas from the fuel cell; an exhaust valve that is disposed in the anode gas discharge passage and exhausts the anode gas; a merging discharge passage that discharges the anode gas discharged from the anode gas discharge passage and the cathode gas discharged from the cathode gas discharge passage; and a control unit configured to control an operation of the fuel cell system. The control unit includes a power generation control unit configured to control an amount of power generated by the fuel cell in a quick warming-up operation of increasing a temperature of the fuel cell using heat emitted from the fuel cell, and a determination unit configured to determine whether the exhaust valve is stuck open. The power generation control unit is configured such that, when it is determined that the exhaust valve is stuck open in the quick warming-up operation, the power generation control unit changes an operating point of the fuel cell which is specified by a current value and a voltage value of the fuel cell such that the current value is higher when the determination unit determines that the exhaust valve is tuck open than when the determination unit determines that the exhaust valve is not stuck open. According to this aspect, by changing the operating point of the fuel cell such that the current value becomes higher, it is possible to increase the requested supply flow rate which is a flow rate of the cathode gas supplied to the fuel cell which is requested for the quick warming-up operation. Accordingly, even when the flow rate of the cathode gas which is actually supplied to the fuel cell changes slightly, it is possible to prevent an amount of power generated by the fuel cell from changing significantly.

The disclosure can be modified in various forms other than the above-mentioned fuel cell system and can be embodied, for example, in the forms of a control method of a fuel cell system and a mobile object in which the fuel cell system is mounted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
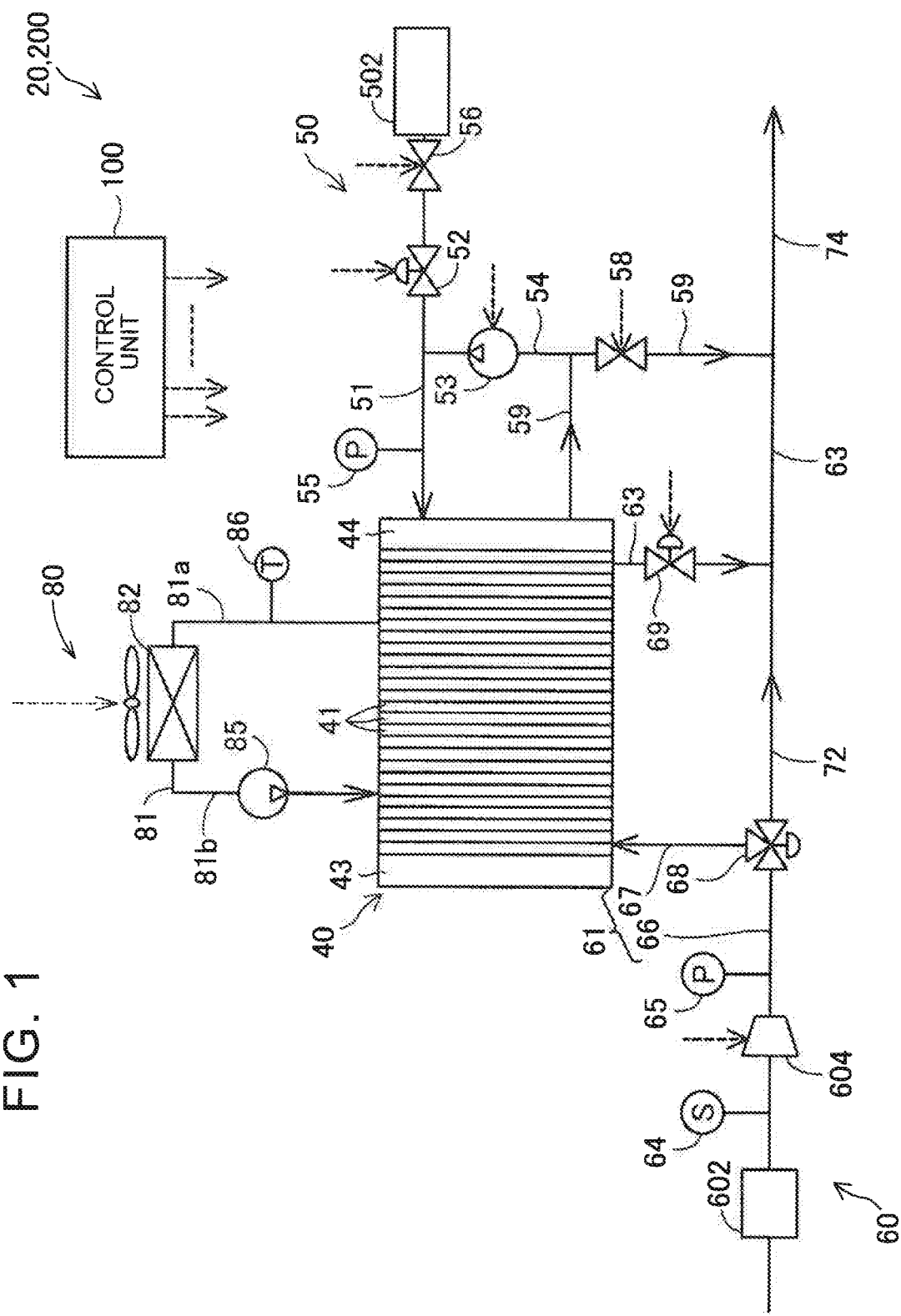
FIG. 1 is a diagram illustrating a configuration of a fuel cell system according to a first embodiment of the disclosure.

A. First embodiment: A-1. Configuration of fuel cell system 20: FIG. 1 is a diagram illustrating a configuration of a fuel cell system 20 according to a first embodiment of the disclosure. The fuel cell system 20 is mounted in a fuel-cell vehicle 200 which is an example of a mobile object and outputs power which is mainly used as a driving force of the fuel-cell vehicle 200 in response to a request from a driver. The fuel cell system 20 includes a fuel cell 40, an anode gas supply/discharge system 50, a cathode gas supply/discharge system 60, a cooling system 80, and a control unit 100. The control unit 100 controls the operations of the fuel cell system 20.

The fuel cell 40 is a polymer electrolyte fuel cell that is supplied with hydrogen (an anode gas) and air (a cathode gas) as reaction gases and generates power by an electrochemical reaction of oxygen and hydrogen. The fuel cell 40 has a stacked structure in which a plurality of unit cells 41 are stacked. Each unit cell 41 is a power generation element that can generate power independently and includes a membrane-electrode assembly which is a power generator with electrodes disposed on both surfaces of an electrolyte membrane and two separators (not illustrated) between which the membrane-electrode assembly is interposed. The electrolyte membrane is a polymer electrolyte membrane that exhibits excellent proton conductivity in a wet state in which moisture is included therein. A manifold (not illustrated) for reaction gases that extends in a stacking direction of the unit cells 41 and is branched and connected to power generation portions of the unit cells 41 is disposed at outer circumferential ends of the unit cells 41. In a stacked state, the unit cells 41 are fastened in a state in which the unit cells are interposed in the stacking direction between first and second end plates 43 and 44.

The anode gas supply/discharge system 50 includes an anode gas supply function, an anode gas discharge function, and an anode gas circulation function. The anode gas supply function is a function of supplying an anode gas to an anode of the fuel cell 40. The anode gas discharge function is a function of discharging an anode gas discharged from the anode of the fuel cell 40 (hereinafter also referred to as an "anode exhaust gas") to the outside. The anode gas circulation function is a function of circulating the anode gas in the fuel cell system 20.

The anode gas supply/discharge system 50 includes a fuel tank 502, a pipe serving as an anode gas supply passage 51, a pressure-reducing valve 52, an ON/OFF valve 56, and a pressure sensor 55 on an upstream side of the fuel cell 40. The anode gas supply passage 51 is a passage for supplying hydrogen as an anode gas to the fuel cell 40 (specifically the anode). The fuel tank 502 is filled with high-pressure hydrogen to be supplied to the fuel cell 40. In the anode gas supply passage 51, an upstream end thereof is connected to the fuel tank 502, and a downstream end thereof is connected to the fuel cell 40. The ON/OFF valve 56 is disposed in the middle of the anode gas supply passage 51 and opens and closes the anode gas supply passage 51 in response to a command from the control unit 100. The pressure-reducing valve 52 is disposed downstream from the ON/OFF valve 56 in the anode gas supply passage 51. The pressure-reducing valve 52 adjusts a pressure of the anode gas in the anode gas supply passage 51 by controlling an opening thereof in response to a command from the control unit 100. The pressure sensor 55 measures a pressure downstream from a connecting portion to an anode gas circulation passage 54 to be described later in the anode gas supply passage 51. The measured pressure is transmitted to the control unit 100.

The anode gas supply/discharge system 50 includes a pipe serving as an anode gas discharge passage 59, an ON/OFF valve 56, a pipe serving as an anode gas circulation passage 54, a circulation pump 53, and an exhaust valve 58 on a downstream side of the fuel cell 40. The anode gas discharge passage 59 is a passage for discharging the anode gas from the fuel cell 40 (specifically the anode). The exhaust valve 58 is disposed in the anode gas discharge passage 59 and opens and closes the anode gas discharge passage 59 in response to a command from the control unit 100. That is, the exhaust valve 58 is used to exhaust the anode gas discharged from the fuel cell 40. The control unit 100 normally sets the exhaust valve 58 in a closed state and switches the exhaust valve 58 to an open state at a predetermined exhaust time or at a time at which an inert gas in the anode exhaust gas is discharged.

The anode gas circulation passage 54 is a passage for returning the anode gas discharged from the fuel cell 40 to the anode gas supply passage 51. An upstream end of the anode gas circulation passage 54 is connected to a portion upstream from the exhaust valve 58 in the anode gas discharge passage 59. A downstream end of the anode gas circulation passage 54 is connected to a portion downstream from the pressure-reducing valve 52 in the anode gas supply passage 51. The operation of the circulation pump 53 is controlled in accordance with a command from the control unit 100. The anode gas in the anode gas circulation passage 54 is fed into the anode gas supply passage 51 by the operation of the circulation pump 53.

The cathode gas supply/discharge system 60 has a cathode gas supply function of supplying a cathode gas to the fuel cell 40 and a cathode gas discharge function of discharging the cathode gas discharged from the fuel cell 40 (also referred to as a "cathode exhaust gas") to the outside.

The cathode gas supply/discharge system 60 includes a filter 602, a compressor 604, a pipe serving as a cathode gas supply passage 61, an air flowmeter 64, and a pressure sensor 65 on an upstream side of the fuel cell 40. The cathode gas supply passage 61 is a passage for supplying air as a cathode gas to the fuel cell 40 (specifically a cathode). A portion upstream from a flow division point at which a flow division valve 68 which will be described later is disposed in the cathode gas supply passage 61 is also referred to as a main passage 66 and a portion downstream from the flow division point is also referred to as a sub passage 67.

The filter 602 is disposed upstream from the compressor 604 in the cathode gas supply passage 61 and removes foreign substance in the air supplied to the fuel cell 40. The compressor 604 is disposed in the cathode gas supply passage 61 and ejects compressed air to a downstream side in response to a command from the control unit 100.

The air flowmeter 64 measures an amount of outside air taken into the compressor 604 upstream from the compressor 604 and transmits the measured value to the control unit 100. The control unit 100 may control an amount of air supplied to the fuel cell 40 by driving the compressor 604 based on the measured value. The pressure sensor 65 measures a pressure of the cathode gas supply passage 61 on an exit side of the compressor 604 (on an entrance side of the fuel cell 40). The measured value of the pressure sensor 65 is transmitted to the control unit 100.

The cathode gas supply/discharge system 60 includes a cathode gas discharge passage 63 and a pressure adjusting valve 69 on a downstream side of the fuel cell 40. The cathode gas discharge passage 63 is a passage for discharging the cathode gas from the fuel cell 40. The pressure adjusting valve 69 is disposed in the cathode gas discharge passage 63. The pressure adjusting valve 69 adjusts a backpressure on the cathode side of the fuel cell 40 by changing an opening of the valve in accordance with a command from the control unit 100.

The fuel cell system 20 includes a flow division valve 68, a pipe serving as a bypass passage 72, and a pipe serving as a merging discharge passage 74. The bypass passage 72 is a passage for discharging a part of the cathode gas ejected from the compressor 604 to the cathode gas discharge passage 63 such that the part of the cathode gas bypasses the fuel cell 40. That is, the bypass passage 72 is a passage for causing the cathode gas in the cathode gas supply passage 61 (specifically, the main passage 66) to flow to the cathode gas discharge passage 63 without passing through the fuel cell 40. An upstream end of the bypass passage 72 is connected to a portion downstream from the compressor 604 in the cathode gas supply passage 61. A downstream end of the bypass passage 72 is connected to a portion downstream from the pressure adjusting valve 69 in the cathode gas discharge passage 63. The flow division valve 68 is disposed in a connecting portion of the bypass passage 72 and the cathode gas supply passage 61. The flow division valve 68 adjusts a flow rate ratio of the cathode gas supplied to the cathode of the fuel cell 40 and the cathode gas supplied to the bypass passage 72 by changing an opening thereof in accordance with a command from the control unit 100. The merging discharge passage 74 is connected to a downstream end of the cathode gas discharge passage 63 and a downstream end of the anode gas discharge passage 59. The merging discharge passage 74 is a passage for discharging the anode gas discharged from the anode gas discharge passage 59 and the cathode gas discharged from the cathode gas discharge passage 63 to the outside. That is, in the merging discharge passage 74, a mixed gas of the cathode gas and the anode gas flows when the exhaust valve 58 is in the open state, and the cathode gas flows when the exhaust valve 58 is in the closed state.

The cooling system 80 includes a pipe serving as a cooling passage 81, a radiator 82, and a circulation pump 85. The cooling passage 81 is a passage for causing a coolant for cooling the fuel cell 40 to flow and includes an upstream passage 81$a$ and a downstream passage 81$b$. The radiator 82 includes a fan for taking outside air in and cools the coolant by causing the coolant in the cooling passage 81 to exchange heat with the outside air. The circulation pump 85 is disposed in the downstream passage 81$b$. The coolant flows in the cooling passage 81 due to a driving force of the circulation pump 85.

In this embodiment, a temperature sensor 86 for measuring a temperature of the fuel cell 40 is disposed in the upstream passage 81$a$. The temperature sensor 86 transmits a measurement result to the control unit 100. As described above, the control unit 100 calculates the temperature of the fuel cell 40 based on the measurement result of the temperature sensor 86. For example, the control unit 100 may consider the measurement result of the temperature sensor 86 as the temperature of the fuel cell 40 or may calculate the temperature of the fuel cell 40 using a map in which the measurement result of the temperature sensor 86 and the temperature of the fuel cell 40 are uniquely correlated with each other.

Figure 2:
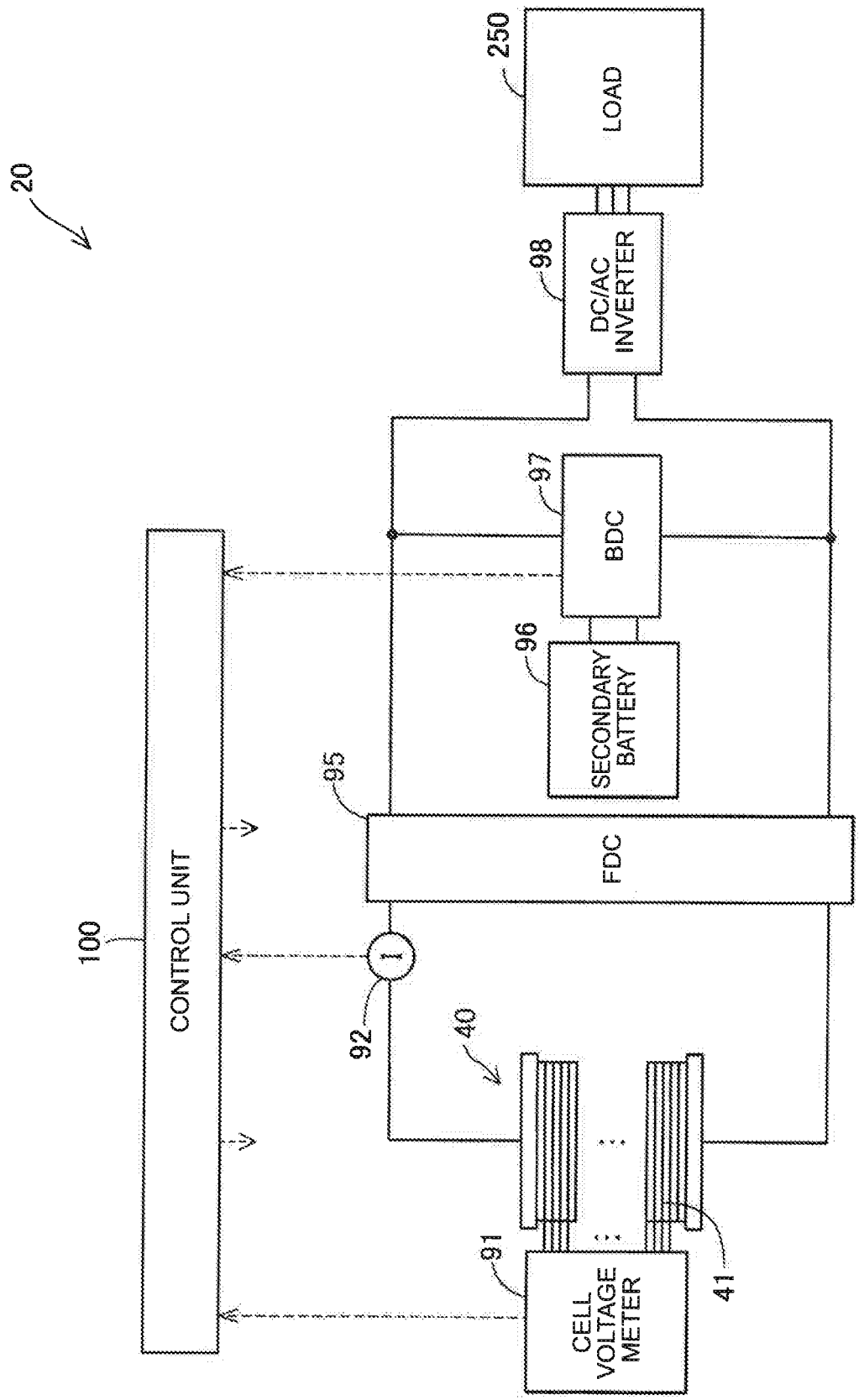
FIG. 2 is a diagram schematically illustrating an electrical configuration of the fuel cell system.

FIG. 2 is a diagram schematically illustrating an electrical configuration of the fuel cell system 20. The fuel cell system 20 includes a secondary battery 96; an FDC 95, a DC/AC inverter 98, a BDC 97, a cell voltage meter 91, and a current measuring unit 92.

The cell voltage meter 91 is connected to all the unit cells 41 of the fuel cell 40 and measures a cell voltage of each unit cell 41. The cell voltage meter 91 transmits the measurement result to the control unit 100. The current measuring unit 92 measures a value of an output current from the fuel cell 40 and transmits the measured value to the control unit 100.

The FDC 95 and the BDC 97 are circuits including a DC/DC converter. The FDC 95 controls the output current from the fuel cell 40 based on a current command value transmitted from the control unit 100. The current command value is a target value of the output current from the fuel cell 40 and is set by the control unit 100.

The FDC 95 has functions of an input voltage meter and an impedance meter. Specifically, the FDC 95 measures a value of an input voltage and transmits the measured value to the control unit 100. The FDC 95 measures a value of impedance of the fuel cell 40 using an AC impedance method. Frequencies of impedance which are used in this embodiment include high frequencies and specifically include 100 Hz to 1 kHz. The FDC 95 steps up the input voltage and supplies the stepped-up input voltage to the DC/AC inverter 98.

The BDC 97 controls charging and discharging of the secondary battery 96 in accordance with a command from the control unit 100. The BDC 97 measures a state of charge (SOC) of the secondary battery 96 and transmits the measured value to the control unit 100. The secondary battery 96 includes a lithium ion battery and serves as an auxiliary power source. The secondary battery 96 performs supply of power to the fuel cell 40 and charging with power generated by the fuel cell 40.

The DC/AC inverter 98 is connected to the fuel cell 40 and a load 250. The DC/AC inverter 98 converts DC power output from the fuel cell 40 and the secondary battery 96 into AC power and supplies the AC power to the load 250.

Regenerative power generated in the load 250 is converted into DC power by the DC/AC inverter 98 and is filled in the secondary battery 96 by the BDC 97. The control unit 100 calculates an output command value in consideration of the SOC of the secondary battery 96 in addition to the load 250.

Figure 3:
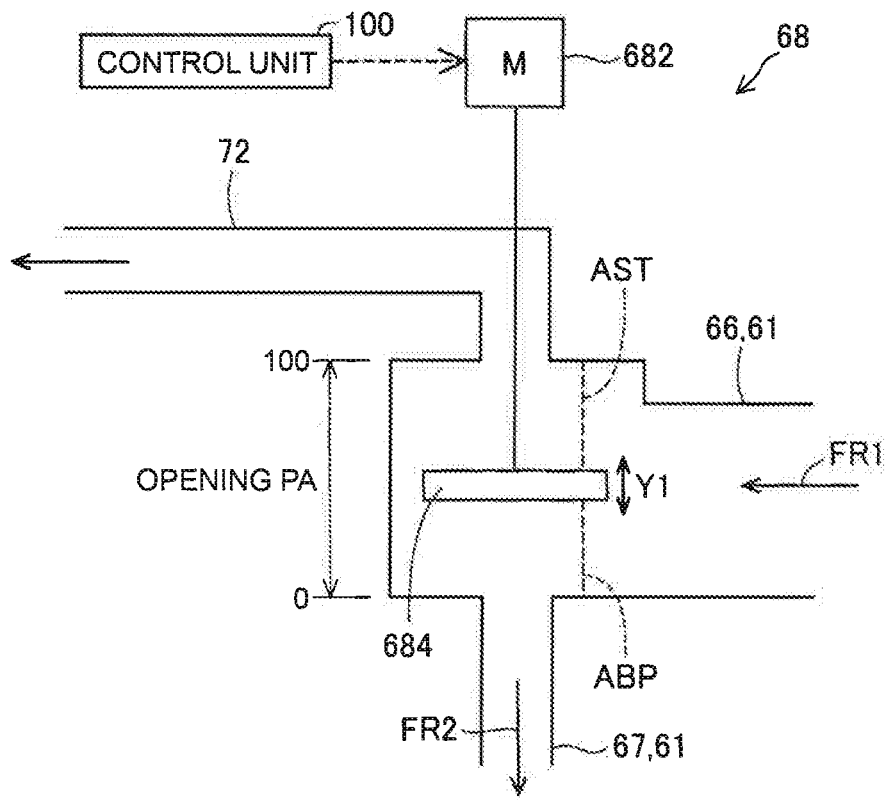
FIG. 3 is a diagram illustrating a flow division valve.

FIG. 3 is a diagram illustrating the flow division valve 68. The flow division valve 68 drives a motor 682 to displace a valve element 684 in accordance with a command (an opening command) from the control unit 100. Accordingly, a torque for adjusting an opening PA of the flow division valve 68 is generated. The motor 682 is a stepping motor in this embodiment. The valve element 684 can be displaced to positions of a plurality of steps in a direction along an arrow Y1. When the valve element 684 is displaced, a bypass-side effective sectional area ABP and a fuel-cell-side effective sectional area AST which are passage sectional areas around the valve element 684 (for example, between the valve element 684 and a valve seat) changes.

In this embodiment, the number of steps of the flow division valve 68 is set to "0" to "240," and the number of steps and the opening PA are uniquely correlated with each other. When the number of steps is "0," the opening PA is 0% and all the cathode gas flowing in the main passage 66 is supplied to the bypass passage 72. On the other hand, when the number of steps of the flow division valve 68 is "240," the opening PA is 100% and all the cathode gas flowing in the main passage 66 is supplied to the sub passage 67.

Here, a ratio (FR2/FR1) of a cathode gas flow rate (a fuel-cell-side cathode gas flow rate) FR2 flowing in the sub passage 67 to a cathode gas flow rate (a total cathode gas flow rate) FR1 flowing in the main passage 66 is referred to as a flow division ratio P.

Figure 4:
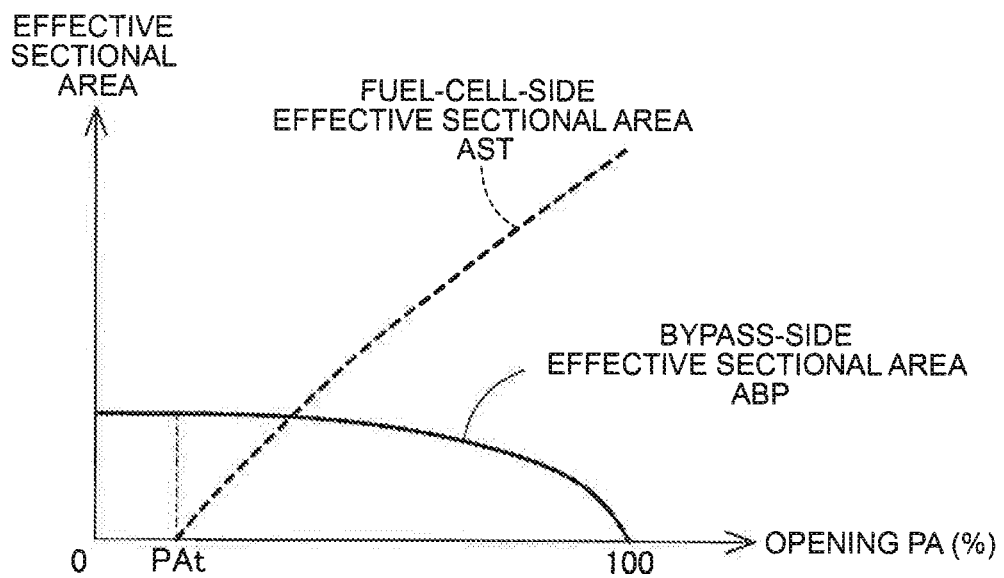
FIG. 4 is a diagram schematically illustrating a relationship between an effective sectional area and an opening of the flow division valve.

FIG. 4 is a diagram schematically illustrating a relationship between the effective sectional area and the opening PA of the flow division valve 68. In view of a seal structure of the valve element 684 and the valve seat in the flow division valve 68, even when the opening PA changes from zero to a slightly large opening PAt, the fuel-cell-side effective sectional area AST is maintained at zero and the bypass-side effective sectional area ABP is maintained at a maximum value. When the opening RA increases further, the valve element 684 is separated from a seal member, and thus the fuel-cell-side effective sectional area AST increases and the bypass-side effective sectional area ABP decreases. In the flow division valve 68, there are an area in which changes of the bypass-side effective sectional area ABP and the fuel-cell-side effective sectional area AST are large and an area in which the changes are small when the opening PA is changed in a minimum unit. Changing of the opening PA in a minimum unit means changing of the number of steps by one step. In the area in which the change of the fuel-cell-side effective sectional area AST is large in the flow division valve 68, there is a likelihood that the flow division ratio P will change greatly when the opening PA is changed.

Figure 5:
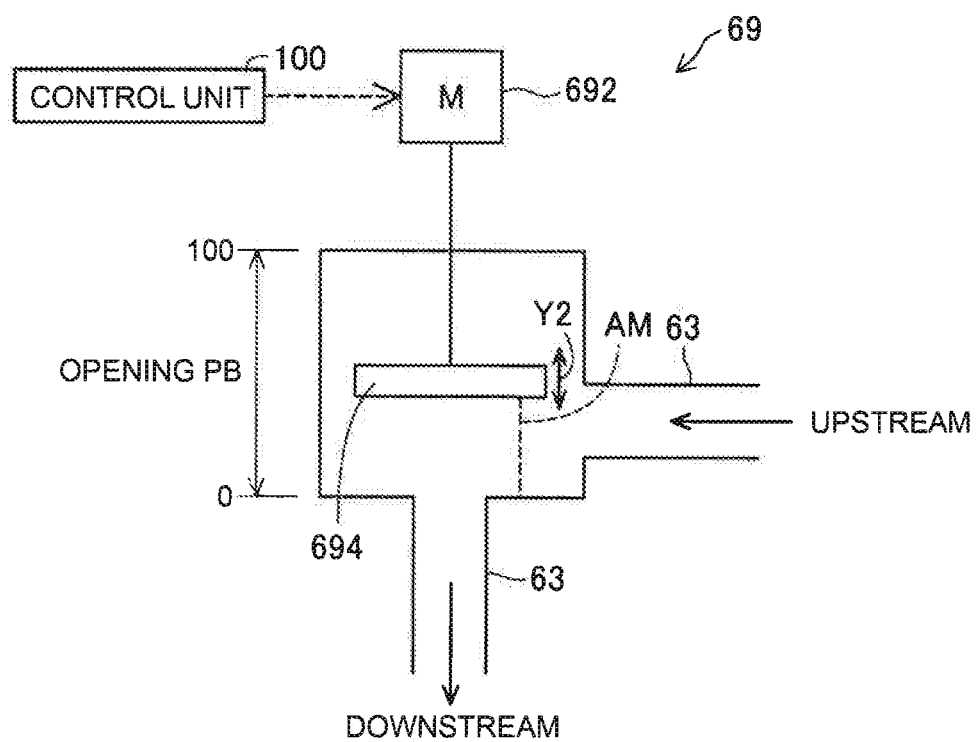
FIG. 5 is a diagram illustrating a pressure adjusting valve.

FIG. 5 is a diagram illustrating the pressure adjusting valve 69. The pressure adjusting valve 69 drives a motor 692 to displace a valve element 694 in accordance with a command (an opening command) from the control unit 100. Accordingly, a torque for adjusting an opening PB of the pressure adjusting valve 69 is generated. The motor 692 is a stepping motor in this embodiment. The valve element 694 can be displaced to positions of a plurality of steps in a direction along an arrow Y2. When the valve element 694 is displaced, an effective sectional area AM which is a passage sectional area between the valve element 694 and the valve seat changes. In this embodiment, the number of steps of the pressure adjusting valve 69 is set to "0" to "120," and the number of steps and the opening PB are uniquely correlated with each other.

Figure 6:
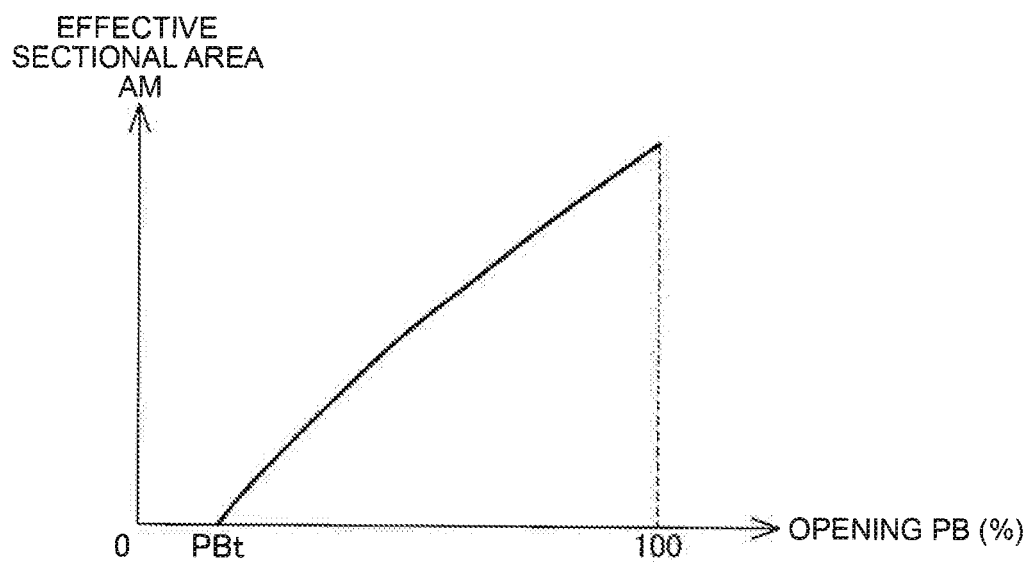
FIG. 6 is a diagram schematically illustrating a relationship between an effective sectional area and an opening of the pressure adjusting valve.

FIG. 6 is a diagram schematically illustrating a relationship between the effective sectional area AM and the opening PB of the pressure adjusting valve 69. In view of a seal structure of the valve element 694 and the valve seat in the pressure adjusting valve 69, even when the opening PB changes from zero to a slightly large opening PBt, the effective sectional area AM is maintained at zero. When the opening PB increases further, the valve element 694 is separated from the seal member and thus the effective sectional area AM increases. In this embodiment, in the pressure adjusting valve 69, there are an area in which a change of the effective sectional area. AM is large and an area in which the change is small when the opening PB is changed in a minimum unit. Changing of the opening PB in a minimum unit means changing of the number of steps by one step. In the area in which the change of the effective sectional area AM is large in the pressure adjusting valve 69, there is a likelihood that the flow division ratio P will change greatly when the opening PB is changed.

Figure 7:
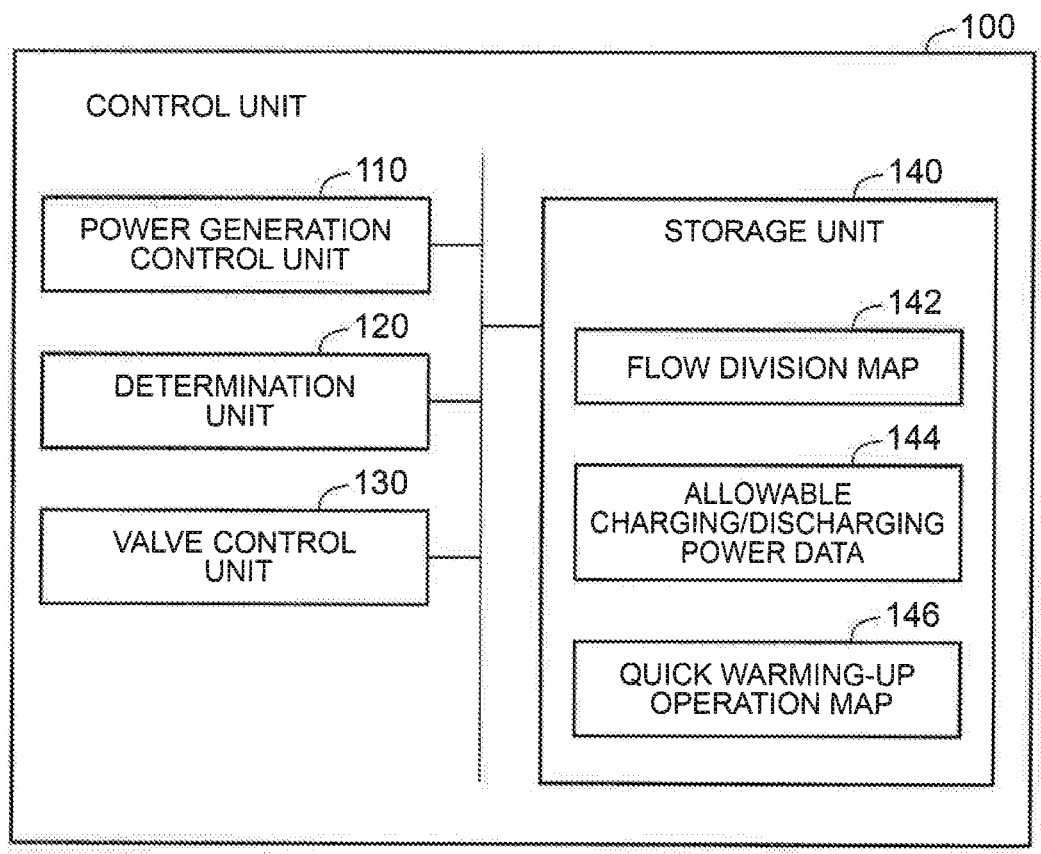
FIG. 7 is a block diagram functionally illustrating a control unit.
Figure 8:
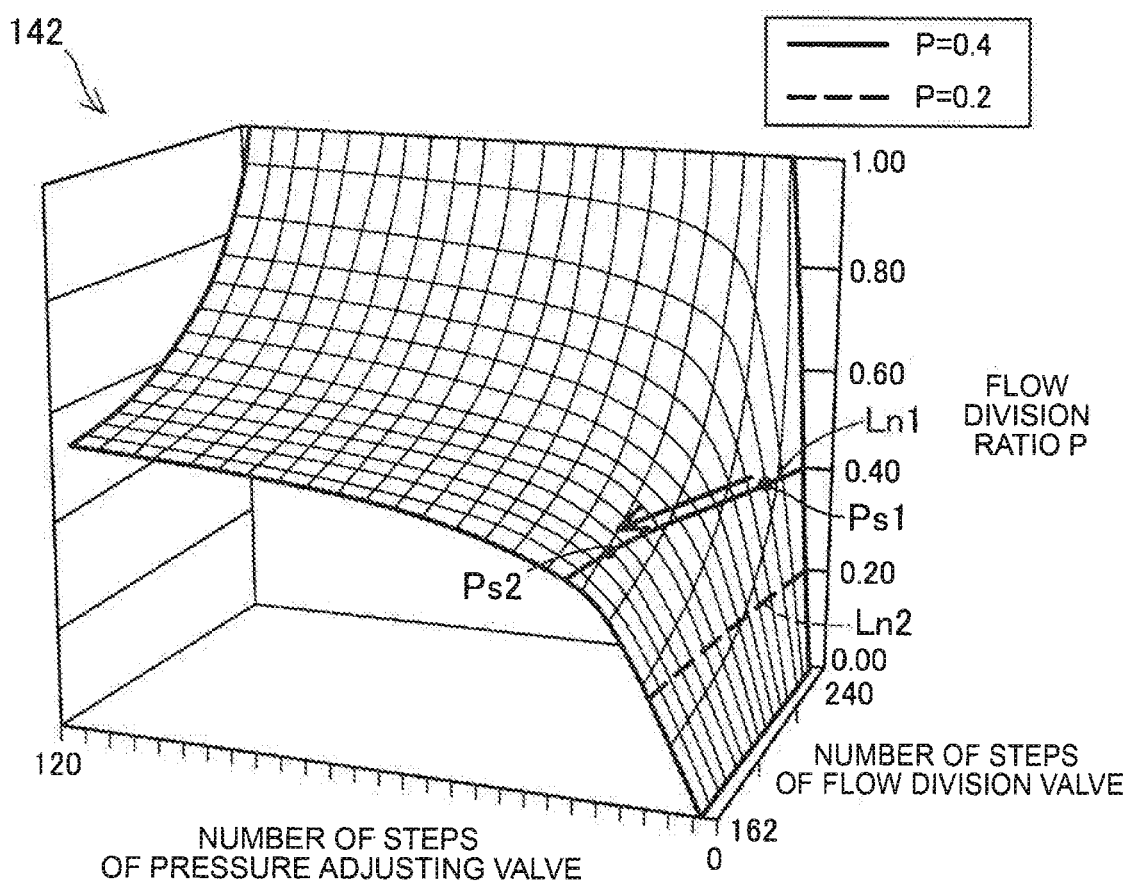
FIG. 8 is a diagram conceptually illustrating a flow division map.

FIG. 7 is a block diagram functionally illustrating the control unit 100. FIG. 8 is a diagram conceptually illustrating a flow division map 142. The control unit 100 includes a storage unit 140 and a CPU which is not illustrated. The storage unit 140 has a well-known configuration of a ROM, a RAM, and the like. The control unit 100 includes a power generation control unit 110, a determination unit 120, and a valve control unit 130 as a program which is performed by the CPU.

The power generation control unit 110 adjusts an amount of power generated by the fuel cell 40 depending on an accelerator depression amount of the fuel-cell vehicle 200, a request for a quick warming-up operation, or the like.

Specifically, the power generation control unit 110 adjusts, a cathode gas flow rate (the fuel-cell-side cathode gas flow rate) and an anode gas flow rate which are supplied to the fuel cell 40 based on the amount of generated power stored in the storage unit 140 in advance depending on the accelerator depression amount, the request for a quick warming-up operation, or the like. The power generation control unit 110 can adjust the fuel-cell-side cathode gas flow rate by controlling the operation of the compressor 604, the flow division valve 68, the pressure adjusting valve 69, or the like. The power generation control unit 110 can adjust the anode gas flow rate by controlling the operation of the ON/OFF valve 56, the circulation pump 53, the exhaust valve 58, or the like. The operation control of the flow division valve 68 and the pressure adjusting valve 69 is performed via the valve control unit 130 by causing the power generation control unit 110 to transmit a command to the valve control unit 130. The quick warming-up operation is an operation of increasing the temperature of the fuel cell 40 using heat emitted from the fuel cell 40, and the cathode gas is supplied to the fuel cell 40 such that a ratio of the amount of supplied cathode gas to the amount of necessary cathode gas required form the amount of power generated from the fuel cell 40 is smaller than that in a normal operation. Accordingly, in the quick warming-up operation, a power generation efficiency of the fuel cell 40 is lower than that in the normal operation of the fuel cell 40 and generation of heat due to power generation is promoted. The power generation control unit 110 adjusts the cathode gas flow rate and the anode gas flow rate supplied to the fuel cell 40 such that the fuel cell 40 becomes a target temperature in a target period, for example, with reference to a quick warming-up operation map 146 stored in the storage unit 140. The quick warming-up operation is performed when the temperature of the fuel cell 40 is equal to or lower than a predetermined temperature. As described above, the power generation control unit 110 has a function of adjusting the amount of power generated by the fuel cell 40 in the quick warming-up operation.

The determination unit 120 determines whether the exhaust valve 58 is stuck open. Specifically, the determination unit 120 determines that the exhaust valve 58 is stuck open when a closed state command is given from the power generation control unit 110 to the exhaust valve 58 but the measured pressure value using the pressure sensor 55 decreases by a predetermined threshold value from a target pressure value in a predetermined time. The determination unit 120 may determine whether the exhaust valve 58 is stuck open using the following method. In this determination method, an anode gas concentration sensor is disposed downstream from the exhaust valve 58 in the anode gas discharge passage 59. The determination unit 120 may determine that the exhaust valve 58 is stuck open when a closed state command is given from the power generation control unit 110 to the exhaust valve 58 but the anode gas concentration measured using the anode gas concentration sensor increases by a predetermined value or more in a predetermined time.

When it is determined that the exhaust valve 58 is stuck open in the quick warming-up operation, the power generation control unit 110 increases an amount of cathode gas ejected from the compressor 604 to dilute the anode gas discharged from the anode gas discharge passage 59 to the outside in comparison with a case in which the exhaust valve 58 is not stuck open. Accordingly, the cathode gas flow rate flowing in the bypass passage 72 increases and the anode gas flowing downstream from the exhaust valve 58 is diluted. A target ejection flow rate when the exhaust valve 58 is stuck open is stored in the storage unit 140. The control unit 100 controls the operation of the compressor 604 such that the target ejection flow rate is achieved.

The valve control unit 130 determines whether a resolution of the flow division valve 68 and a resolution of the pressure adjusting valve 69 satisfy a predetermined condition (a flow division condition), and sets (changes) an operable opening area of one valve such that the flow division condition is satisfied when it is determined that one valve does not satisfy the flow division condition. In this embodiment, a resolution refers to a degree of change of the flow division ratio P when the opening of one valve is kept constant and the opening of the other valve is changed in a minimum unit. The larger the degree of change of the flow division ratio P becomes, the lower the resolution becomes and the smaller the degree of change of the flow division ratio P becomes, the higher the resolution becomes. The operable opening area is an opening area which is changeable by control of the power generation control unit 110 and is set to a range narrower than a full opening area. The flow division ratio refers to a condition that the cathode gas flow rate supplied to the fuel cell 40 enters an allowable range of a requested supply flow rate which is required for the quick warming-up operation. The requested supply flow rate is a flow rate for generating a requested amount of generate power which is required for the quick warming-up operation.

The allowable range is set based on the requested amount of generated power and the allowable charging/discharging power of the secondary battery 96. Specifically, the allowable range is set to a range in which the actual amount of power generated by the fuel cell 40 based on an actual cathode gas flow rate supplied to the fuel cell 40 can be adjusted to reach the requested amount of generated power by charging and discharging of the secondary battery 96. In this embodiment, the allowable range is set with a maximum charging power and a maximum discharging power of the secondary battery 96 considered as the allowable charging/discharging power of the secondary battery 96. In this embodiment, for example, a range in which the actual amount of generated power enters a range which is ±10 kW of the requested amount of generated power is set as the allowable range of the requested supply flow rate. The allowable range may be set as follows instead of the method of setting the allowable range to a constant range depending on the maximum charging power and the maximum discharging power of the secondary battery 96. That is, the control unit 100 may acquire a charging power of the secondary battery 96 at predetermined time intervals and may set a range of the fuel-cell-side cathode gas flow rate at which the actual amount of generated power can be corrected to the requested amount of generated power within the ranges of charging power which is actually chargeable and discharging power which is actually dischargeable as the allowable range. By setting the allowable range in consideration of the allowable charging/discharging power of the secondary battery 96 as described above, it is possible to adjust over-power using the secondary battery 96 even when the amount of generated power gets out of the requested amount of generated power.

A flow division map 142, an allowable charging/discharging power data 144, and a quick warming-up operation map 146 are stored in the storage unit 140.

The flow division map 142 is a map in which a combination of the number of steps of the pressure adjusting valve 69 and the number of steps of the flow division valve 68 is correlated with the flow division ratio P. That is, when the number of steps of the pressure adjusting valve 69 and the number of steps of the flow division valve 68 are determined, the flow division ratio P is determined. For example, when the operation of the cathode gas supply/discharge system 60 is controlled such that the flow division ratio P is 0.40, the power generation control unit 110 controls the numbers of steps of the pressure adjusting valve 69 and the flow division valve 68 such that the number of steps of the pressure adjusting valve 69 and the number of steps of the flow division valve 68 located on a line Ln1 in FIG. 8 are achieved. In FIG. 8, a line Ln2 on which the flow division ratio P is 0.20 is indicated by a dotted line. In FIG. 8, only a part of the number of steps (162 to 240) of the flow division valve 68 is illustrated for the purpose of convenience of explanation.

The power generation control unit 110 determines a supply flow rate of the cathode gas (the requested supply flow rate) supplied to the fuel cell 40, which is required for the quick warming-up operation, with reference to the quick warming-up operation map 146. The power generation control unit 110 determines the flow division ratio P based on the flow rate ejected from the compressor 604 and the requested supply flow rate and determines the number of steps of the pressure adjusting valve 69 and the number of steps of the flow division valve 68 which satisfy the flow division ratio P determined with reference to the flow division map 142. The power generation control unit 110 controls the operations of the pressure adjusting valve 69 and the flow division valve 68 via the valve control unit 130 such that the determined numbers of steps are reached. In order to reduce a likelihood that responsiveness of the pressure adjusting valve 69 and the flow division valve 68 to an opening command will decrease, the valve control unit 130 determines the number of steps satisfying the determined flow division ratio P in the operable opening area set by the valve control unit 130. That is, when the number of steps is changed in a wide range, the time until the opening is actually set in response to the opening command may be extended and thus the opening is changed in a partial area of the entire operable opening area.

The allowable charging/discharging power (for example, the state of charge) of the secondary battery 96 is stored in the storage unit 140 as the allowable charging/discharging power data 144. The quick warming-up operation map 146 is a map in which the cathode gas flow rate and the anode gas flow rate supplied to the fuel cell 40 are uniquely correlated with the amount of generated power (the requested amount of generated power) required for the quick warming-up operation.

Figure 9:
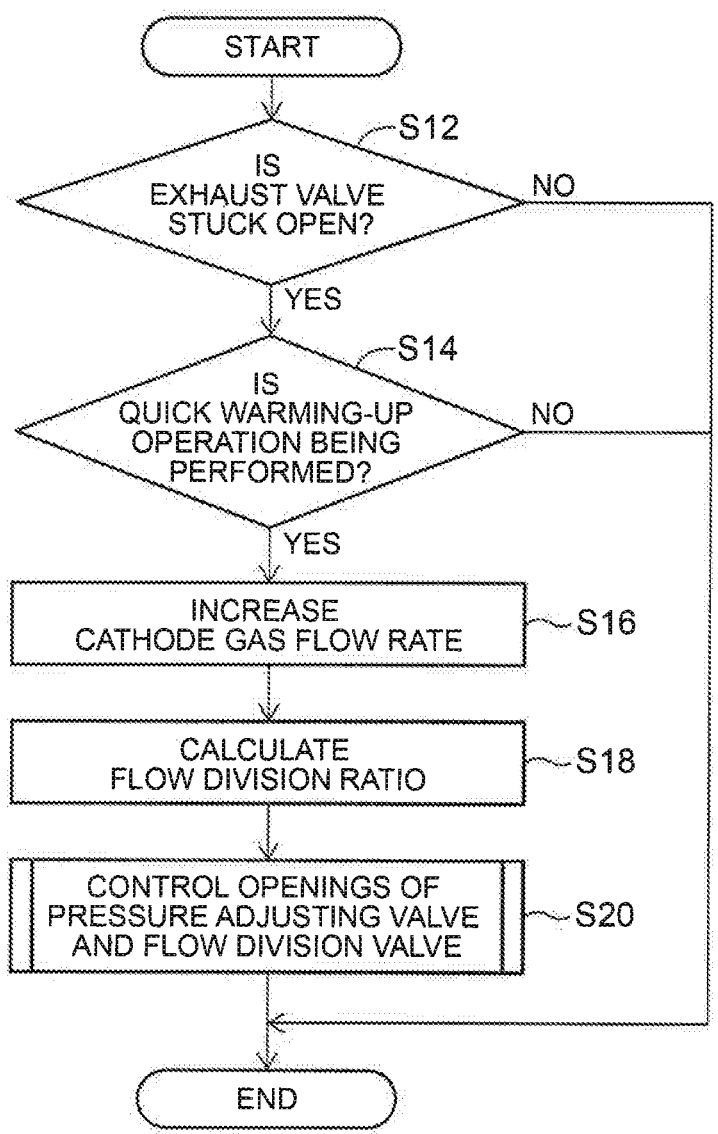
FIG. 9 is a flowchart illustrating a processing flow which is performed by the control unit.
Figure 10:
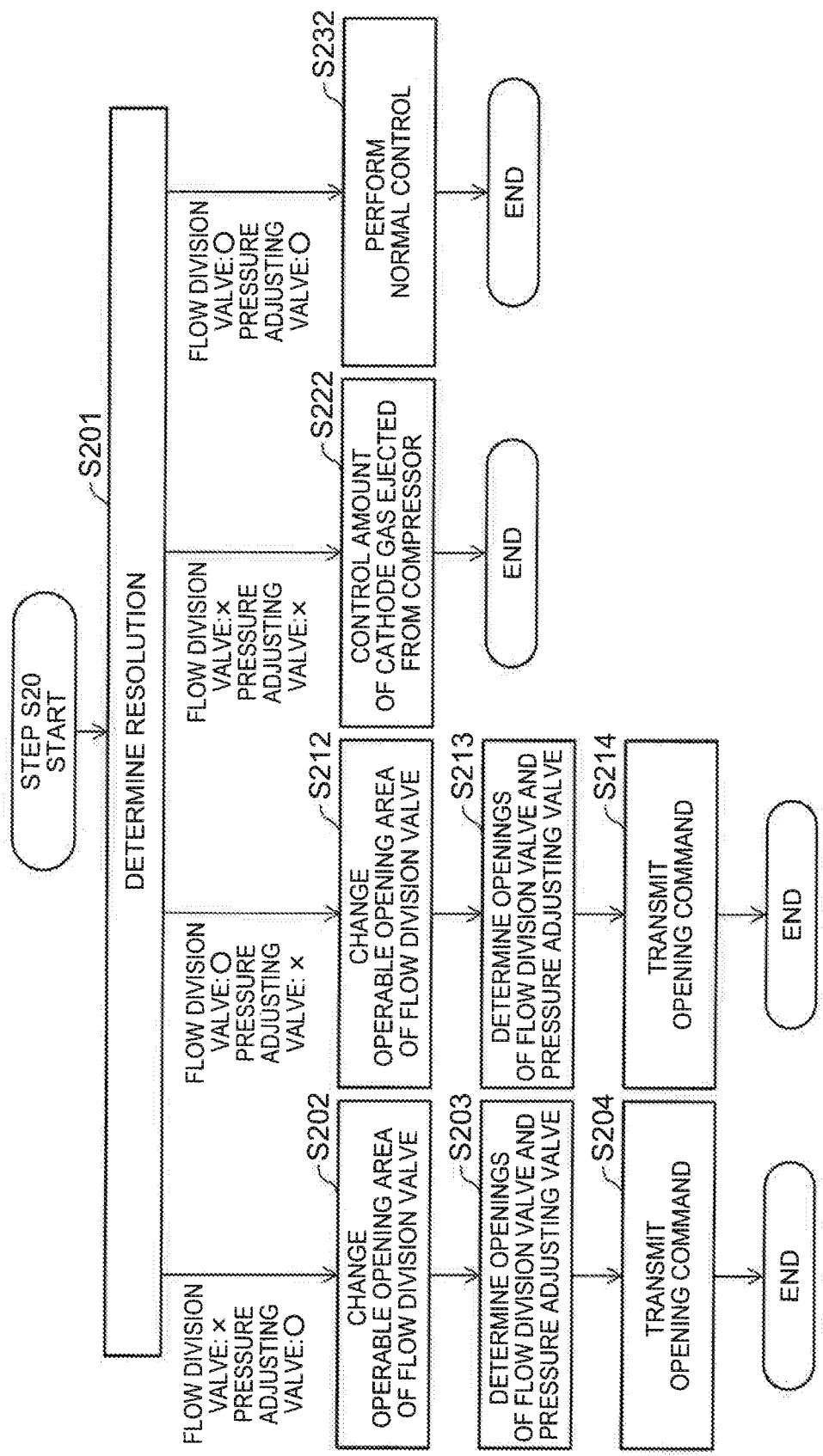
FIG. 10 is a flowchart illustrating a processing flow of Step S20.

A-2. Processing flow which is performed by control unit: FIG. 9 is a flowchart illustrating a processing flow which is performed by the control unit 100. FIG. 10 is a flowchart illustrating a processing flow of S20. The processing flow illustrated in FIG. 9 is performed, for example, after the control unit 100 gives a command for change from an open state to a closed state to the exhaust valve 58. First, the determination unit 120 determines whether the exhaust valve 58 is stuck open (Step S12). When the determination unit 120 determines that the exhaust valve 58 is not stuck open, the control unit 100 ends the processing flow. When the determination unit 120 determines that the exhaust valve 58 is stuck open, the control unit 100 determines whether the fuel cell 40 performs a quick warming-up operation (Step S14). In Step S14, for example, the determination is performed, for example, based on a flag, which is stored in the storage unit 140, indicating that the quick warming-up operation is performed. When it is determined that the quick warming-up operation is not performed, the control unit 100 ends the processing flow. When it is determined that the quick warming-up operation is performed, the power generation control unit 110 increases the amount of cathode gas ejected from the compressor 604 and increases the cathode gas flow rate flowing in the main passage 66 (Step S16).

Then, the power generation control unit 110 calculates the flow division ratio P based on the requested supply flow rate of the cathode gas required for the quick warming-up operation and the amount of cathode gas ejected from the compressor 604 (Step S18). Subsequently to Step S18, the control unit 100 controls the opening RA of the flow division valve 68 and the opening PB of the pressure adjusting valve 69 with reference to the flow division ratio P, the flow division map 142, and the allowable charging/discharging power data 144 (Step S20).

As illustrated in FIG. 10, the valve control unit 130 performs resolution determination of whether the resolution of the pressure adjusting valve 69 and the resolution of the flow division valve 68 satisfy the flow division condition in the operable opening area at the current time point (Step S201). The valve control unit 130 determines whether the resolution of the pressure adjusting valve 69 satisfies the flow division condition as follows. That is, the opening PA of the flow division valve 68 and the opening PB of the pressure adjusting valve 69 are determined with reference to the flow division map 142 such that a flow division ratio P closest to the flow division ratio P calculated in Step S18 is achieved in the operable opening area at the current time point. When the opening PB of the pressure adjusting valve 69 is changed by a minimum unit (one step) more or less than the determined opening PB while maintaining the determined opening PA of the flow division valve 68, it is determined whether the flow division condition is satisfied. The valve control unit 130 determines whether the resolution of the flow division valve 68 satisfies the flow division condition using the same method.

When the resolution of the flow division valve 68 does not satisfy the flow division condition and the resolution of the pressure adjusting valve 69 satisfies the flow division condition, the valve control unit 130 changes the operable opening area of the flow division valve 68 to an area in which the flow division condition is satisfied (Step S202). That is, the valve control unit 130 changes the resolution of the flow division valve 68 from a low area to a high area. For example, when the flow division ratio P is 0.4 and the resolution of the flow division valve 68 does not satisfy the flow division condition in the operable opening area including a point Ps1 in FIG. 8, the operable opening area is changed to an operable opening area with a higher resolution including a point Ps2 such that the flow division condition is satisfied. The valve control unit 130 determines the opening PA of the flow division valve 68 and the opening PB of the pressure adjusting valve 69 with reference to the flow division map 142 such that a flow division ratio P closest to the flow division ratio P calculated in Step S18 is achieved in the changed operable opening area (Step S203). The control unit 100 (the valve control unit 130) changes the opening PA of the flow division valve 68 and the opening PB of the pressure adjusting valve 69 by transmitting opening commands (step number commands) for the determined openings PB and PA to the flow division valve 68 and the pressure adjusting valve 69 (Step S204).

When the resolution of the pressure adjusting valve 69 does not satisfy the flow division condition and the resolution of the flow division valve 68 satisfies the flow division condition, the valve control unit 130 changes the operable opening area of the pressure adjusting valve 69 to an area in which the flow division condition is satisfied (Step S212). That is, the valve control unit 130 changes the resolution of the pressure adjusting valve 69 from a low area to a high area. For example, when the flow division ratio P is 0.4 and the resolution of the pressure adjusting valve 69 does not satisfy the flow division condition in the operable opening area including the point Ps1 in FIG. 8, the operable opening area is changed to an operable opening area with a higher resolution including the point Ps2 such that the flow division condition is satisfied. The valve control unit 130 determines the opening PA of the flow division valve 68 and the opening PB of the pressure adjusting valve 69 with reference to the flow division map 142 such that a flow division ratio P closest to the flow division ratio P calculated in Step S18 is achieved in the changed operable opening area (Step S213). The control unit 100 (the valve control unit 130) changes the opening PA of the flow division valve 68 and the opening PEI of the pressure adjusting valve 69 by transmitting opening commands (step number commands) for the determined openings PB and PA to the flow division valve 68 and the pressure adjusting valve 69 (Step S214).

When none of the flow division valve 68 and the pressure adjusting valve 69 satisfies the flow division condition, the valve control unit 130 adjusts the cathode gas flow rate supplied to the fuel cell 40 such that the requested supply flow rate for the quick warming-up operation is achieved by controlling the amount of cathode gas ejected from the compressor 604 (Step S222). That is, in a case in which the flow rate of the cathode gas supplied to the fuel cell 40 is out of the allowable range when the opening PB of the pressure adjusting valve 69 is changed in a minimum unit and in a case in which the flow rate of the cathode gas supplied to the fuel cell 40 is out of the allowable range when the opening PA of the flow division valve 68 is changed in a minimum unit, the valve control unit 130 performs the following control. That is, the valve control unit 130 sets the openings PA and PB constantly to the openings PA and PB at which the flow division ratio P closest to the flow division ratio P calculated based on the requested supply flow rate at the current time point (the processing time point of Step S18) is achieved. Then, the power generation control unit 110 controls the amount of cathode gas ejected from the compressor 604 such that the requested supply flow rate is achieved. By controlling the amount of cathode gas ejected, it is possible to accurately control the flow division ratio P. Accordingly, it is possible to prevent the amount of power generated by the fuel cell 40 from changing significantly.

When both of the flow division valve 68 and the pressure adjusting valve 69 satisfy the flow division condition, the valve control unit 130 performs normal control (Step S232). In the normal control, the openings PA and PB are controlled such that the flow division ratio P closest to the flow division ratio P is achieved in the operable opening area at the current time point.

According to the first embodiment, in a case in which the flow rate of the cathode gas supplied to the fuel cell 40 gets out of the allowable range when the opening PB of the pressure adjusting valve 69 is changed in a minimum unit, the valve control unit 130 sets the operable opening area of the pressure adjusting valve 69 to an area included in the allowable range when the opening PB of the pressure adjusting valve 69 is changed in a minimum unit (Step S212 in FIG. 10). The valve control unit 130 sets the opening PA of the flow division valve 68 such that the flow rate of the cathode gas supplied to the fuel cell 40 does not change at the opening PB of the pressure adjusting valve 69 before the operable opening area is not changed and the opening PB of the pressure adjusting valve 69 after the operable opening area is changed (Step S213 in FIG. 10). Accordingly, since the flow division ratio P can be accurately controlled, it is possible to prevent the amount of power generated by the fuel cell 40 from changing significantly.

According to the first embodiment, in a case in which the flow rate of the cathode gas supplied to the fuel cell 40 gets out of the allowable range of the requested supply flow rate when the opening PA of the flow division valve 68 is changed in a minimum unit, the valve control unit 130 sets the operable opening area of the flow division valve 68 to an area included in the allowable range when the opening PA of the flow division valve 68 is changed in a minimum unit (Step S202 in FIG. 10). The valve control unit 130 sets the opening PB of the pressure adjusting valve 69 such that the flow rate of the cathode gas supplied to the fuel cell 40 does not change at the opening PA of the flow division valve 68 before the operable opening area is not changed and the opening PA of the flow division valve 68 after the operable opening area is changed (Step S203 in FIG. 10). Accordingly, since the flow division ratio P can be accurately controlled, it is possible to prevent the amount of power generated by the fuel cell 40 from changing significantly.

A-3. Modified aspect of processing flow which is performed by control unit: The processing flow which is performed by the control unit 100 according to the first embodiment may be modified to another processing flow as long as the flow division ratio P can be accurately controlled. A modified aspect of the processing flow will be described below.

Figure 11:
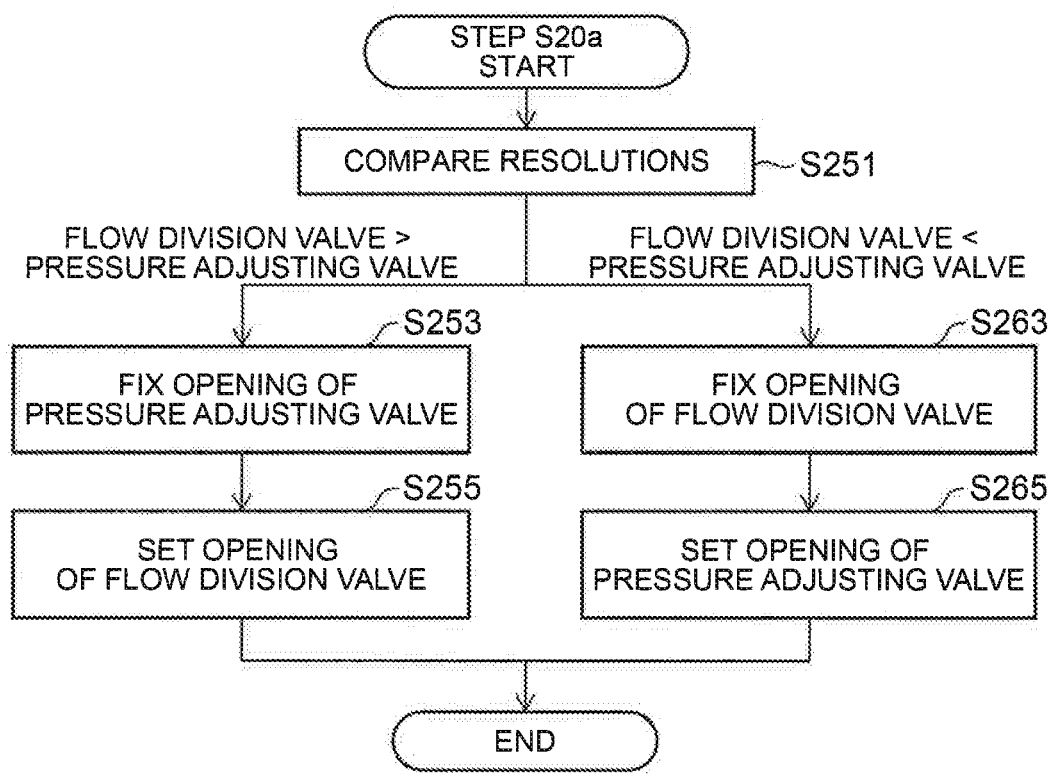
FIG. 11 is a flowchart illustrating a processing flow in a first modified example.

A-3-1. First modified aspect: FIG. 11 is a flowchart illustrating a processing flow according to a first modified aspect. The first modified aspect is different from the processing flow according to the first embodiment, in that Step S20a is performed instead of Step S20.

The valve control unit 130 compares the resolution of the flow division valve 68 and the resolution of the pressure adjusting valve 69 in the operable opening area at the current time point (Step S251). That is, the valve control unit 130 compares a first change which is a change of the flow rate of the cathode gas supplied to the fuel cell 40 when the opening PB of the pressure adjusting valve 69 is changed in a minimum unit and a second change which is a change of the flow rate of the cathode gas supplied to the fuel cell 40 when the opening PA of the flow division valve 68 is changed in a minimum unit with reference to the flow division map 142.

When the first change is greater than the second change and the resolution of the pressure adjusting valve 69 is lower than the resolution of the flow division valve 68, the opening PB of the pressure adjusting valve 69 is fixed (Step S253). That is, the operable opening area is changed from a non-changed operable opening area which is expressed by a plurality of continuous steps to a narrow operable opening area which is expressed by a single step. Then, the valve control unit 130 sets the opening PA of the flow division valve 68 such that a flow division ratio P closest to the flow division ratio P calculated in Step S18 is achieved (Step S255). Subsequently to Step S255, the power generation control unit 110 controls the opening PA of the flow division valve 68 such that the changed requested supply flow rate is achieved depending on a change of the requested supply flow rate required for the quick warming-up operation in a state in which the opening PB of the pressure adjusting valve 69 is fixed.

When the second change is greater than the first change and the resolution of the flow division valve 68 is lower than the resolution of the pressure adjusting valve 69, the opening PA of the flow division valve 68 is fixed (Step S263). That is, the operable opening area is changed from a non-changed operable opening area which is expressed by a plurality of continuous steps to a narrow operable opening area which is expressed by a single step. Then, the valve control unit 130 sets the opening PB of the pressure adjusting valve 69 such that a flow division ratio P closest to the flow division ratio P calculated in Step S18 is achieved (Step S265). Subsequently to Step S265, the power generation control unit 110 controls the opening PB of the pressure adjusting valve 69 such that the changed requested supply flow rate is achieved depending on a change of the requested supply flow rate required for the quick warming-up operation in a state in which the opening PA of flow division valve 68 is fixed.

The resolution determination of Step S201 may be performed before Step S251, and the process of Step S222 illustrated in FIG. 10 may be performed when none of the resolution of the flow division valve 68 and the resolution of the pressure adjusting valve 69 satisfies the flow division condition. That is, when the requested supply flow rate for the quick warming-up operation changes, the power generation control unit 110 controls the amount of cathode gas ejected from the compressor 604 such that the changed requested supply flow rate is achieved.

According to the first modified aspect, by setting the opening of one valve having a large change of the flow rate of the pressure adjusting valve 69 and the flow division valve 68 to be constant and controlling the opening of the other valve, it is possible to accurately control the flow division ratio P. Accordingly, it is possible to prevent the amount of power generated by the fuel cell 40 from changing significantly.

Figure 12:
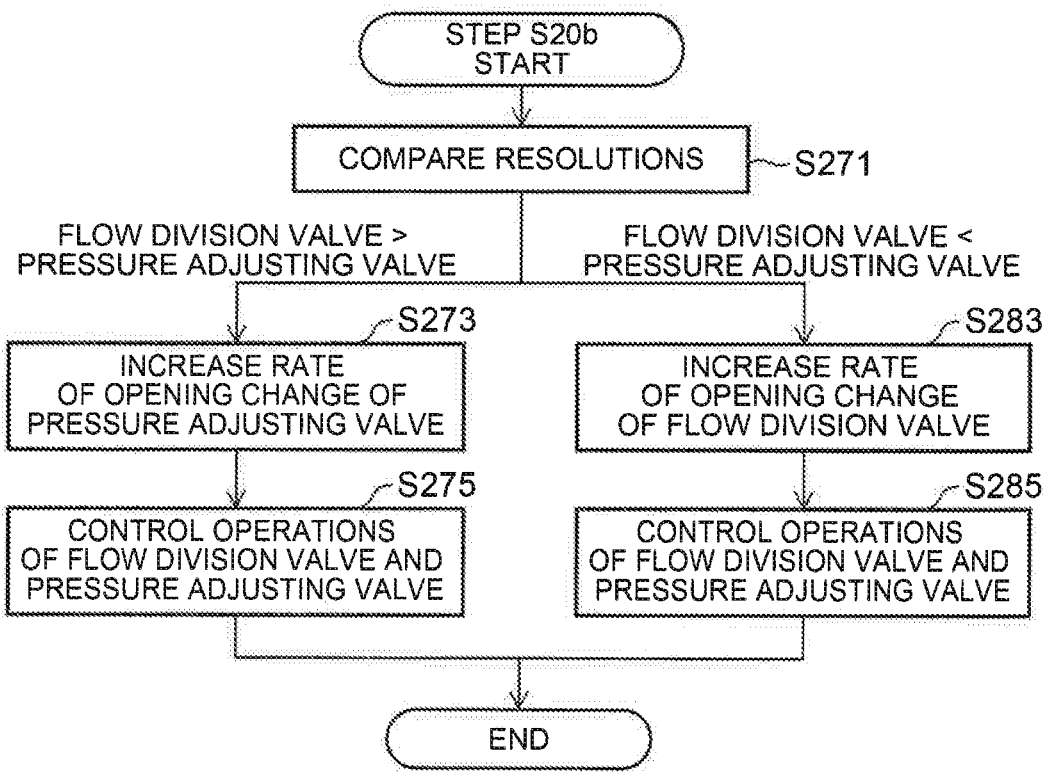
FIG. 12 is a flowchart illustrating a processing flow in a second modified example.
Figure 13:
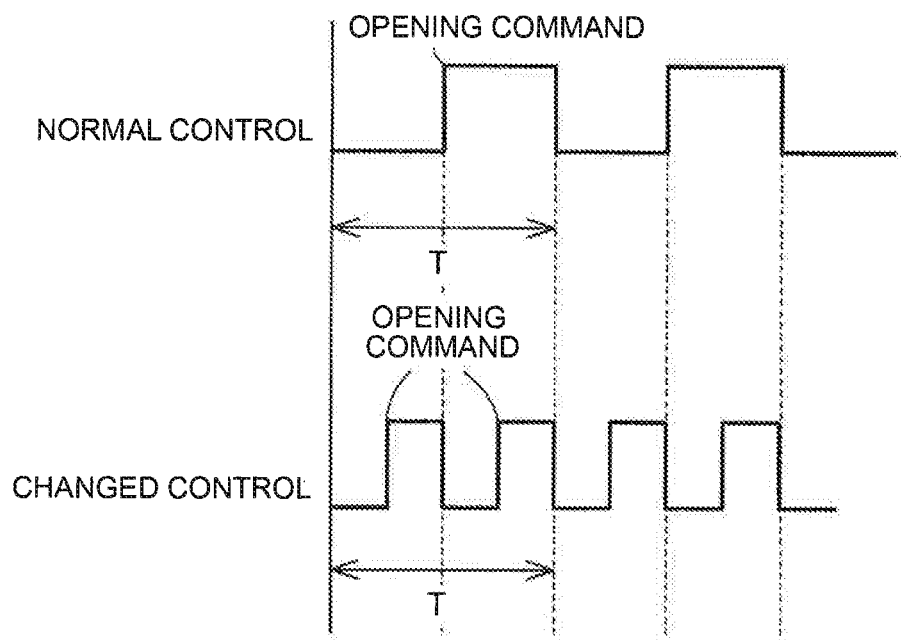
FIG. 13 is a diagram conceptually illustrating process details of Steps S273 and S283.

A-4. Second modified aspect of processing flow which is performed by control unit: FIG. 12 is a flowchart illustrating a processing flow according to a second modified aspect. FIG. 13 is a diagram conceptually illustrating processing details of Steps S273 and S283. The second modified aspect is different from the processing flow according to the first embodiment, in that Step S20b is performed instead of Step S20.

As illustrated in FIG. 12, similarly to Step S255, the valve control unit 130 compares the resolution of the flow division valve 68 and the resolution of the pressure adjusting valve 69 in the operable opening area at the current time point (Step S271). When it is determined in Step S271 that the resolution of the pressure adjusting valve 69 is lower than the resolution of the flow division valve 68, the valve control unit 130 sets a rate of opening change of the pressure adjusting valve 69 to be higher than in a normal control (Step S273). That is, the valve control unit 130 performs dither control of minutely changing a valve opening on the pressure adjusting valve 69. The rate of opening change refers to the opening frequency which is changeable per unit time T as illustrated in FIG. 13. For example, one opening command per unit time T can be transmitted to the pressure adjusting valve 69 in the normal control, but two opening commands per unit time T can be transmitted to the pressure adjusting valve. 69 in the control changed in Step S273. Accordingly, it is possible to enhance the resolution of the pressure adjusting valve 69 per unit time T. That is, the effective sectional area AM corresponding to the number of steps is stepwise correlated in the normal control, but an average value of the effective sectional areas AM per unit time T can be set as the effective sectional area AM between neighboring numbers of steps by transmitting more opening commands per unit time T to the pressure adjusting valve 69 in the changed control. In other words, by setting the rate of opening change in the pressure adjusting valve 69 to be higher than in the normal control, the average resolution per unit time T is higher than in the normal control.

As illustrated in FIG. 12, subsequently to Step S273, the valve control unit 130 controls the operations of the flow division valve 68 and the pressure adjusting valve 69 such that a flow division ratio P closest to the flow division ratio P calculated in Step S18 is achieved (Step S275). The valve control unit 130 calculates the effective sectional area M of the pressure adjusting valve 69 for achieving the flow division ratio P and changes the number of steps to a high frequency such that the calculated effective sectional area M is achieved.

When it is determined in Step S271 that the resolution of the flow division valve 68 is lower than the resolution of the pressure adjusting valve 69, the valve control unit 130 sets a rate of opening change of the flow division valve 68 to be higher than in a normal control (Step S283). That is, the valve control unit 130 performs dither control of minutely changing a valve opening on the flow division valve 68. Subsequently to Step S283, the valve control unit 130 controls the operations of the flow division valve 68 and the pressure adjusting valve 69 such that a flow division ratio P closest to the flow division ratio P calculated in Step S18 is achieved (Step S285). The valve control unit 130 calculates the fuel-cell-side effective sectional area AST of the flow division valve 68 for achieving the flow division ratio P and changes the number of steps of the flow division valve 68 to a high frequency such that the calculated fuel-cell-side effective sectional area AST is achieved.

According to the second modified aspect, the valve control unit 130 compares a first change which is a change of the flow rate of the cathode gas supplied to the fuel cell 40 when the opening PB of the pressure adjusting valve 69 is changed in a minimum unit and a second change which is a change of the flow rate of the cathode gas supplied to the fuel cell 40 when the opening PA of the flow division valve 68 is changed in a minimum unit. Then, the valve control unit 130 sets the rate of opening change of the pressure adjusting valve 69 to be higher than in the normal control when the first change is greater than the second change. The valve control unit 130 sets the rate of opening change of the flow division valve 68 to be higher than in the normal control when the second change is greater than the first change. Accordingly, since the flow division ratio P can be accurately controlled, it is possible to prevent the amount of power generated by the fuel cell 40 from changing significantly.

Figure 14:
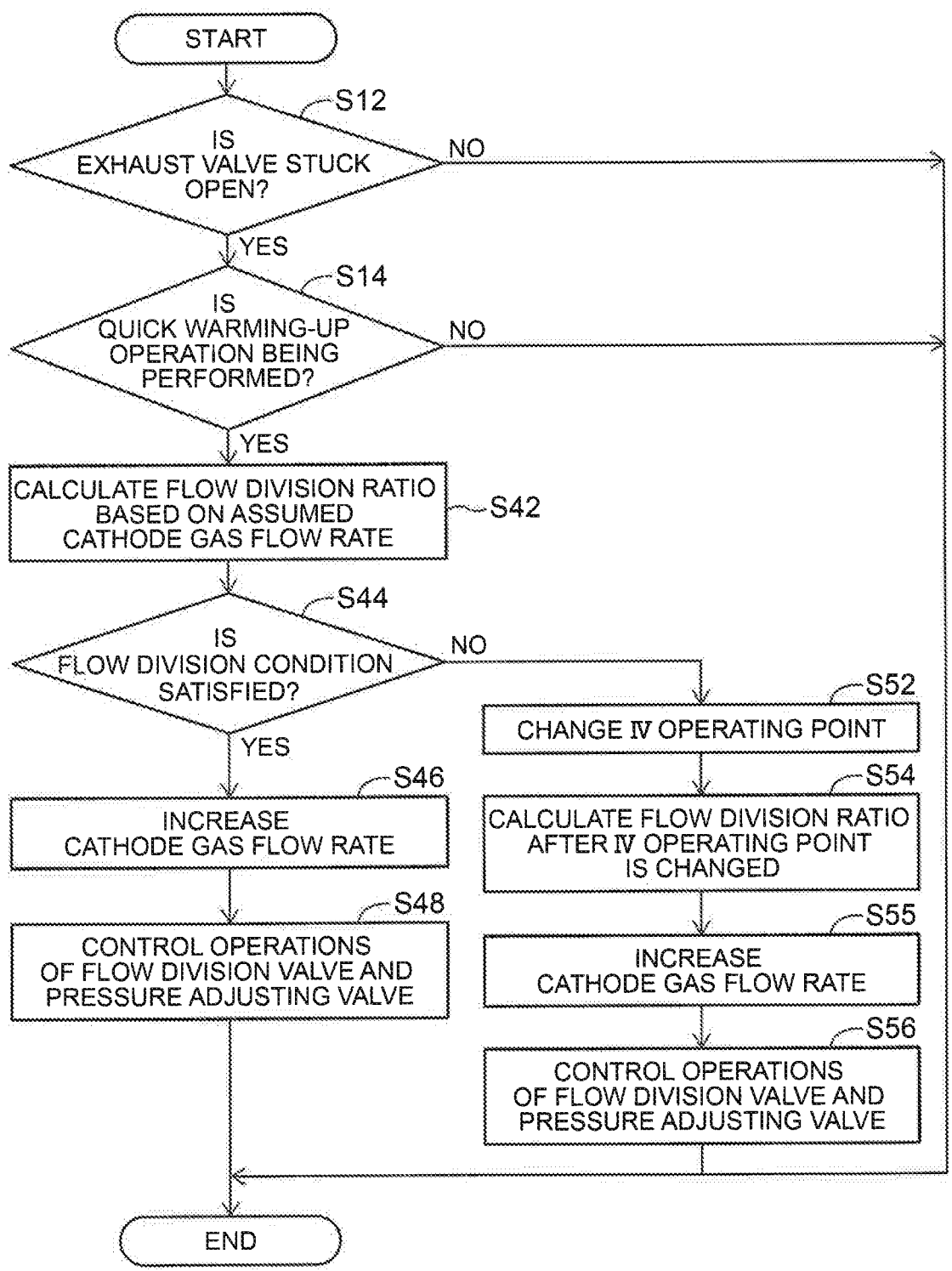
FIG. 14 is a flowchart illustrating a processing flow which is performed by a control unit according to a second embodiment.
Figure 15:
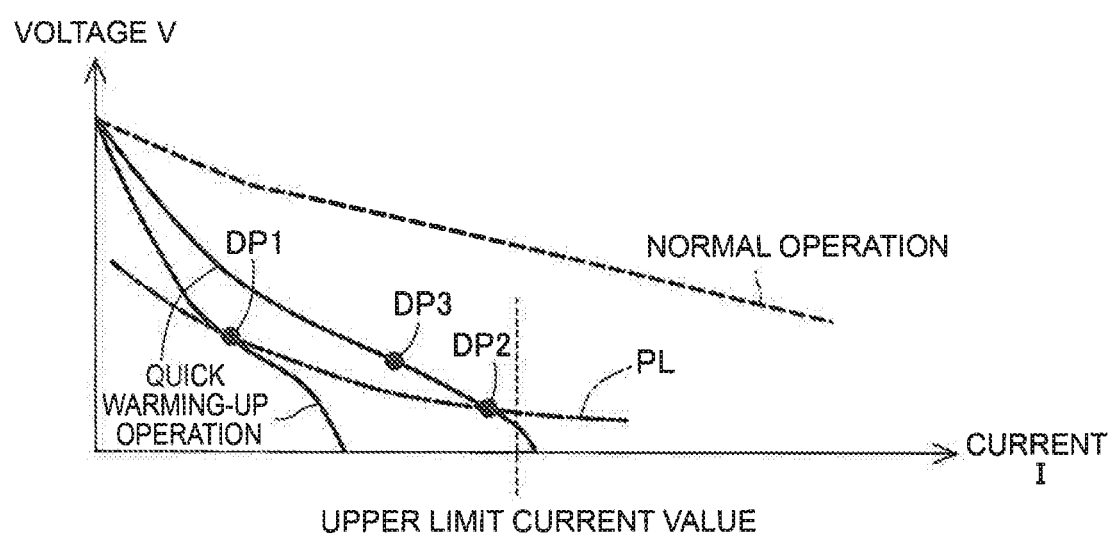
FIG. 15 is a diagram illustrating an IV operating point.

B. Second embodiment: FIG. 14 is a flowchart illustrating a processing flow which is performed by a control unit 100 according to a second embodiment. FIG. 15 is a diagram illustrating an IV operating point. In FIG. 15, an IV operating point in a normal operation of the fuel cell system 20 and an IV operating point in a quick warming-up operation are illustrated.

The second embodiment is different from the first embodiment in a control processing flow when the fuel cell 40 performs a quick warming-up operation and the exhaust valve 58 is stuck open. The other configurations (for example, the fuel cell 40 or the cathode gas supply/discharge system 60) are the same as in the first embodiment and thus the same elements as in the first embodiment will be appropriately omitted. The same processes in the second embodiment as performed by the control unit 100 in the first embodiment will be referenced by the same reference signs and detailed description thereof will not be repeated.

When the exhaust valve 58 is stuck open and the fuel cell 40 performs a quick warming-up operation (YES in Step S12 and YES in Step S14), the determination unit 120 calculates the flow division ratio P based on an assumed cathode gas flow rate which is an increased cathode flow rate (Step S42). Then, the determination unit 120 determines whether the resolution of the flow division valve 68 and the resolution of the pressure adjusting valve 69 satisfy the flow division condition in the operable opening area at the current time point (Step S44). The processing details which are performed in Step S44 are the same as the processing details which are performed in Step S201 in FIG. 10. When it is determined in Step S44 that both of the resolution of the flow division valve 68 and the resolution of the pressure adjusting valve 69 satisfy the flow division condition (YES in Step S44), the power generation control unit 110 increases the cathode gas flow rate by controlling the compressor 604 (Step S46). Then, the valve control unit 130 controls the operations of the flow division valve 68 and the pressure adjusting valve 69 such that a flow division ratio P closest to the flow division ratio P calculated in Step S42 is achieved (Step S48).

When it is determined in Step S44 that at least one of the resolution of the flow division valve 68 and the resolution of the pressure adjusting valve 69 does not satisfy the flow division condition (NO in Step S44), the power generation control unit 110 changes an operating point (an IV operating point) of the fuel cell 40 which is specified by a current value and a voltage value of the fuel cell 40 (Step S52). Specifically, in the requested amount of generated power, the IV operating point is changed to a side on which the current value is higher such that the cathode gas flow rate supplied to the fuel cell 40 increases. The changing of the IV operating point is performed by causing the power generation control unit 110 to control the DC/DC converter.

As illustrated in FIG. 15, for example, when the quick warming-up operation is controlled such that the fuel cell operates at an operating point DP1, the operating point is changed to an operating point DP2 or an operating point DP3 which has a higher current value than at the operating point DP1 in Step S52. The operating point DP2 is located on a curve PL in which the same amount of power as at the operating point DP1 is generated by the fuel cell 40. The operating point DP3 is an IV operating point with power generation efficiency lower than in the normal operation of the fuel cell 40. At the IV operating point, the cathode gas flow rate supplied to the fuel cell (the fuel-cell-side cathode gas flow rate) increases by increasing the current value. For example, the fuel-cell-side cathode gas flow rate at the operating point DP1 is about 600 NL/min, and the fuel-cell-side cathode gas flow rate at the operating point DP2 is about 1200 NL/min. When the operating point is changed from the operating point DP1 to the operating point DP3, the amount of power generated by the fuel cell 40 is changed before and after changing of the operating point. In this case, it is preferable that the changed operating point DP3 be an operating point in an allowable power generation range of the requested amount of power generated by the fuel cell and required for the quick warming-up operation. The allowable power generation range is a range in which the actual amount of power generated by the fuel cell can be adjusted to the requested amount of generated power by charging and discharging of the secondary battery 96. In order to prevent a voltage drop due to a concentration overvoltage of the fuel cell 40, it is preferable that the current value is changed to a higher value in a range which is equal to or lower than a predetermined upper limit current value.

As illustrated in FIG. 14, the power generation control unit 110 calculates the flow division ratio P after the IV operating point is changed (Step S54). The power generation control unit 110 increases the cathode gas flow rate by controlling the compressor 604 (Step S55). Then, the valve control unit 130 controls the operations of the flow division valve 68 and the pressure adjusting valve 69 such that a flow division ratio P closest to the flow division ratio P calculated in Step S52 is achieved (Step S56).

According to the second embodiment, when the determination unit 120 determines that the exhaust valve 58 is stuck open in a quick warming-up operation, the operating point of the fuel cell 40 is changed to a current value higher than when it is determined that the exhaust valve 58 is not stuck open. Accordingly, it is possible to increase the requested supply flow rate which is a supply flow rate of the cathode gas to the fuel cell 40 which is required for the quick warming-up operation. Accordingly, even when a flow rate of the cathode gas actually supplied to the fuel cell 40 is slightly changed from the requested supply flow rate, it is possible to prevent the amount of power generated by the fuel cell 40 from changing significantly.

C. Modified example: In the embodiments, an example of the configuration of a fuel cell has been described above. However, the configuration of the fuel cell can be modified in various forms, and can be subjected to, for example, addition, deletion, substitution, or the like of an element.

C-1. First modified example: In the embodiments, the flow division valve 68 and the pressure adjusting valve 69 include a stepping motor as a drive source of each valve, but the disclosure is not limited thereto and various driver sources may be used. For example, a DC motor may be used as the drive source. In this case, the "changing of the opening in a minimum unit" in the embodiments refers to "changing of the operating in one drive unit."

The disclosure is not limited to the above-mentioned embodiments, examples, and modified examples, but can be embodied in various forms without departing from the thereof. For example, the technical features in the embodiments, the examples, and the modified examples corresponding to the technical features in the aspects in the SUMMARY can be appropriately substituted or combined to achieve some or all of the above-mentioned advantages. The technical features may be appropriately deleted unless described to be essential in the specification.

What is claimed is:

1. A fuel cell system comprising:
   a fuel cell;
   a cathode gas supply passage configured to supply a cathode gas to the fuel cell;
   a cathode gas discharge passage configured to discharge the cathode gas from the fuel cell;
   a pressure adjusting valve that is disposed in the cathode gas discharge passage and configured to adjust a back-pressure on a cathode side of the fuel cell;
   a compressor that is disposed in the cathode gas supply passage and configured to eject cathode gas;
   a bypass passage configured to discharge a part of the cathode gas ejected from the compressor to the cathode gas discharge passage such that the part of the cathode gas bypasses the fuel cell;
   a flow division valve that is disposed in a connecting portion of the bypass passage and the cathode gas supply passage, the flow division valve being configured to adjust a flow rate ratio of the cathode gas supplied to the fuel cell and the cathode gas supplied to the bypass passage;

an anode gas supply passage configured to supply an anode gas to the fuel cell;

an anode gas discharge passage configured to discharge the anode gas from the fuel cell;

an exhaust valve that is disposed in the anode gas discharge passage and configured to exhaust the anode gas;

a merging discharge passage configured to discharge the anode gas discharged from the anode gas discharge passage and the cathode gas discharged from the cathode gas discharge passage; and a control unit configured to control an operation of the fuel cell system, wherein the control unit includes:

a power generation control unit configured to control an amount of power generated by the fuel cell in a warming-up operation of increasing a temperature of the fuel cell using heat emitted from the fuel cell when the temperature of the fuel cell is determined to be equal to or lower than a predetermined temperature, a determination unit configured to determine whether the exhaust valve is stuck in an open configuration during the warming-up operation, and a valve control unit configured such that, when it is determined that the exhaust valve is stuck in the open configuration during the warming-up operation, the valve control unit sets at least one of an operable opening area, which is an opening area capable of being changed by control, or a rate of opening change, which is an opening changeable frequency at which the opening is changeable per unit time, for at least one of the pressure adjusting valve or the flow division valve such that a flow rate of the cathode gas supplied to the fuel cell is within an allowable range for a requested supply flow rate, the requested supply flow rate being a cathode gas flow rate for generating an amount of power required for the warming-up operation.

2. The fuel cell system according to claim 1, wherein the valve control unit is configured to:

change the operable opening area of the pressure adjusting valve to an area at which the flow rate of the cathode gas supplied to the fuel cell is within the allowable range when an opening of the pressure adjusting valve is changed by a minimum unit and the flow rate of the cathode gas supplied to the fuel cell gets out of the allowable range; and set an opening of the flow division valve such that the flow rate of the cathode gas supplied to the fuel cell does not change at the opening of the pressure adjusting valve before the operable opening area of the pressure adjusting valve changes and at the opening of the pressure adjusting valve after the operable opening area of the pressure adjusting valve changes.

3. The fuel cell system according to claim 1, wherein the valve control unit is configured to:

change the operable opening area of the flow division valve to an area at which the flow rate of the cathode gas supplied to the fuel cell is within the allowable range when an opening of the flow division valve is changed by a minimum unit and the flow rate of the cathode gas supplied to the fuel cell gets out of the allowable range of the requested supply flow rate; and set an opening of the pressure adjusting valve such that the flow rate of the cathode gas supplied to the fuel cell does not change at the opening of the flow division valve before the operable opening area of the flow division valve changes and at the opening of the flow division valve after the operable opening area of the flow division valve changes.

4. The fuel cell system according to claim 2, further comprising:

a secondary battery configured to perform supply of power to the fuel cell and charging with power generated by the fuel cell, wherein the allowable range is set based on the amount of power required for the warming-up operation and an allowable charging/discharging power of the secondary battery.

5. The fuel cell system according to claim 3, further comprising:

a secondary battery configured to perform supply of power to the fuel cell and charging with power generated by the fuel cell, wherein the allowable range is set based on the amount of power required for the warming-up operation and an allowable charging/discharging power of the secondary battery.

6. The fuel cell system according to claim 1, wherein the valve control unit is configured to:

compare a first change, which is a change of the flow rate of the cathode gas supplied to the fuel cell when an opening of the pressure adjusting valve changes by a minimum unit, with a second change, which is a change of the flow rate of the cathode gas supplied to the fuel cell when an opening of the flow division valve changes by a minimum unit;

set the opening of the pressure adjusting valve to be constant when the first change is greater than the second change;

set the opening of the flow division valve to be constant when the second change is greater than the first change; and control the opening of the valve having a smaller change of flow rate of the pressure adjusting valve and the flow division valve such that the flow rate of the cathode gas is in the allowable range of the requested supply flow rate.

7. The fuel system according to claim 1, wherein the valve control unit is configured to set openings of the pressure adjusting valve and the flow division valve to be constant in a case in which the flow rate of the cathode gas supplied to the fuel cell gets out of the allowable range when the opening of the pressure adjusting valve changes by a minimum unit and in a case in which the flow rate of the cathode gas supplied to the fuel cell gets out of the allowable range when the opening of the flow division valve changes by a minimum unit, and the power generation control unit is configured to control the flow rate of the cathode gas ejected from the compressor such that the flow rate of the cathode gas is in the allowable range of the requested supply flow rate.

8. The fuel cell system according to claim 1, wherein the valve control unit is configured to:

compare a first change, which is a change of the flow rate of the cathode gas supplied to the fuel cell when an opening of the pressure adjusting valve changes by a minimum unit, with a second change, which is a change of the flow rate of the cathode gas supplied to the fuel cell when an opening of the flow division valve changes by a minimum unit;

when the first change is greater than the second change, set the rate of opening change of the pressure adjusting valve to be higher than a rate of opening change of the pressure adjusting valve when the warming-up operation is not performed; and when the second change is greater than the first change, set the rate of opening change of the flow division valve to be higher than a rate of opening change of the flow division valve when the warming-up operation is not performed.

9. A fuel cell system comprising:

a fuel cell;

a cathode gas supply passage configured to supply a cathode gas to the fuel cell;

a cathode gas discharge passage configured to discharge the cathode gas from the fuel cell;

a pressure adjusting valve that is disposed in the cathode gas discharge passage and configured to adjust a back-pressure on a cathode side of the fuel cell;

a compressor that is disposed in the cathode gas supply passage and configured to eject cathode gas;

a bypass passage configured to discharge a part of the cathode gas ejected from the compressor to the cathode gas discharge passage such that the part of the cathode gas bypasses the fuel cell;

a flow division valve that is disposed in a connecting portion of the bypass passage and the cathode gas supply passage, the flow division valve being configured to adjust a flow rate ratio of the cathode gas supplied to the fuel cell and the cathode gas supplied to the bypass passage;

an anode gas supply passage configured to supply an anode gas to the fuel cell;

an anode gas discharge passage configured to discharge the anode gas from the fuel cell;

an exhaust valve that is disposed in the anode gas discharge passage and configured to exhaust the anode gas;

a merging discharge passage configured to discharge the anode gas discharged from the anode gas discharge passage and the cathode gas discharged from the cathode gas discharge passage; and a control unit configured to control an operation of the fuel cell system, wherein the control unit includes:

a power generation control unit configured to control an amount of power generated by the fuel cell in a warming-up operation of increasing a temperature of the fuel cell using heat emitted from the fuel cell when the temperature of the fuel cell is determined to be equal to or lower than a predetermined temperature, and a determination unit configured to determine whether the exhaust valve is stuck in an open configuration during the warming-up operation, wherein the power generation control unit is configured such that, when it is determined that the exhaust valve is stuck in the open configuration during the warming-up operation, the power generation control unit changes a current value of the fuel cell and a voltage value of the fuel cell, the power generation control unit being configured to set a higher current value when the determination unit determines that the exhaust valve is stuck open than when the determination unit determines that the exhaust valve is not stuck open.

* * * * *

UNITED STATES PATENT AND TRADEMARK OFFICE
CERTIFICATE OF CORRECTION

| | |
|---|---|
| PATENT NO. | : 10,665,876 B2 |
| APPLICATION NO. | : 15/831766 |
| DATED | : May 26, 2020 |
| INVENTOR(S) | : Tomio Yamanaka et al. |

It is certified that error appears in the above-identified patent and that said Letters Patent is hereby corrected as shown below:

On the Title Page

Please insert the heading and following priority information:
--(30) Foreign Application Priority Data
December 9, 2016        (JP)    2016-239142--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*